(12) United States Patent
Suzuki et al.

(10) Patent No.: US 12,022,285 B2
(45) Date of Patent: Jun. 25, 2024

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: Brother Kogyo Kabushiki Kaisha, Nagoya (JP)

(72) Inventors: Satoshi Suzuki, Nagoya (JP); Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/149,816

(22) Filed: Jan. 4, 2023

(65) Prior Publication Data
US 2023/0143173 A1  May 11, 2023

Related U.S. Application Data

(63) Continuation of application No. 17/387,216, filed on Jul. 28, 2021, now Pat. No. 11,564,091, which is a
(Continued)

(30) Foreign Application Priority Data
Mar. 30, 2018  (JP) .................................. 2018-068821

(51) Int. Cl.
*H04W 12/06*  (2021.01)
*H04L 9/30*  (2006.01)
*H04W 12/0431*  (2021.01)

(52) U.S. Cl.
CPC .............. *H04W 12/06* (2013.01); *H04L 9/30* (2013.01); *H04W 12/0431* (2021.01)

(58) Field of Classification Search
CPC ..................................................... H04W 12/06
See application file for complete search history.

(56) References Cited

U.S. PATENT DOCUMENTS 9,015,329 B2   4/2015  Chang et al.
9,397,989 B1   7/2016  Ramalingam et al.
(Continued)

FOREIGN PATENT DOCUMENTS

CN   106454822 A   2/2017
CN   110198539 A   9/2019
(Continued)

OTHER PUBLICATIONS

Aug. 8, 2023—(JP) Notice of Reasons for Refusal—App 2019-177989.
(Continued)

*Primary Examiner* — Bradley W Holder
(74) *Attorney, Agent, or Firm* — Banner & Witcoff, Ltd.

(57) ABSTRACT

A communication device may receive a specific signal from a first external device; display a first instruction screen; in a case where it is instructed that the target process is to be executed in a situation where the first instruction screen is displayed, send a public key to the first external device, wherein in a case where it is not instructed that the target process is to be executed in the situation where the first instruction screen is displayed, the public key is not sent; after the public key has been sent to the first external device, receive an authentication request from the first external device; send an authentication response to the first external device; receive connection information from the first external device; and establish, by using the connection information, a wireless connection between the communication device and a second external device.

8 Claims, 12 Drawing Sheets

Related U.S. Application Data continuation of application No. 16/360,492, filed on Mar. 21, 2019, now Pat. No. 11,109,228.

(56) References Cited

U.S. PATENT DOCUMENTS

| | | | |
|---|---|---|---|
| 10,169,587 B1 | 1/2019 | Nix | |
| 10,434,988 B2 | 10/2019 | Gennermann et al. | |
| 2002/0126780 A1 | 9/2002 | Oshima et al. | |
| 2004/0066756 A1* | 4/2004 | Ahmavaara | H04W 48/18 370/328 |
| 2007/0109262 A1 | 5/2007 | Oshima et al. | |
| 2008/0158597 A1 | 7/2008 | Hashimoto et al. | |
| 2009/0028049 A1 | 1/2009 | Boudreau et al. | |
| 2011/0215921 A1* | 9/2011 | Ben Ayed | H04W 12/06 340/539.11 |
| 2015/0229475 A1 | 8/2015 | Benoit et al. | |
| 2016/0286021 A1 | 9/2016 | Takeuchi | |
| 2016/0294819 A1 | 10/2016 | Salmela et al. | |
| 2017/0026833 A1 | 1/2017 | Goto | |
| 2017/0048705 A1 | 2/2017 | Fujita | |
| 2017/0156174 A1* | 6/2017 | Chaponniere | H04W 60/00 |
| 2017/0244703 A1 | 8/2017 | Lee et al. | |
| 2018/0069718 A1 | 3/2018 | Terao | |
| 2018/0069726 A1* | 3/2018 | Ohhira | H04L 61/5092 |
| 2018/0077318 A1 | 3/2018 | Gusmano | |
| 2018/0084098 A1 | 3/2018 | Takeuchi | |
| 2019/0022688 A1 | 1/2019 | Zhang | |
| 2019/0110204 A1 | 4/2019 | Goto | |
| 2019/0215878 A1 | 7/2019 | Goto | |
| 2019/0320317 A1 | 10/2019 | Sakai | |
| 2020/0007674 A1 | 1/2020 | Takeuchi | |
| 2021/0297523 A1 | 9/2021 | Takeuchi | |
| 2022/0015161 A1 | 1/2022 | Goto | |

FOREIGN PATENT DOCUMENTS

| | | | |
|---|---|---|---|
| EP | 2456245 A1 | 5/2012 | |
| JP | 2002-271281 A | 9/2002 | |
| JP | 2016-187088 A | 10/2016 | |
| JP | 2016-187090 A | 10/2016 | |
| JP | 2017-028454 A | 2/2017 | |
| JP | 2017-152927 A | 8/2017 | |
| JP | 2018006983 A | 1/2018 | |
| JP | 2018-37978 A | 3/2018 | |
| JP | 2018-042058 A | 3/2018 | |

OTHER PUBLICATIONS

Nov. 13 2023—(CN) First Office Action—App 202011027058.7.
Wi-Fi Alliance, "DRAFT Device Provisioning Protocol Technical Specification", Version 0.2.11, pp. 1-133, 2017.
May 4, 2021—(US) Notice of Allowance—U.S. Appl. No. 16/360,492.
Feb. 22, 2022—(JP) Notification of Reason for Rejection—App 2018-068821.
Wi-Fi Alliance: "Device Provisioning Protocol Specification", Wi-Fi Alliance, Apr. 1, 2018 (Apr. 1, 2018), pp. 1-124, XP055670685.
Feb. 5, 2021—(EP) Extended Search Report—App 20198313.7.
Mar. 28, 2022—(US) Office Action—U.S. Appl. No. 17/032,532.
U.S. Appl. No. 17/032,532 Specification and Drawings as filed Sep. 25, 2020, 38 pages.
Sep. 16, 2022—(US) Notice of Allowance—U.S. Appl. No. 17/387,216.
Oct. 20, 2022—(US) Non-Final Office Action—U.S. Appl. No. 17/032,532.

* cited by examiner (Second Embodiment)
(Bootstrapping and Authentication: Case C)

(Second Embodiment)
(Bootstrapping and Authentication: Case E)

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE

This application is a continuation of U.S. patent application Ser. No. 17/387,216 filed Jul. 28, 2021 which is a continuation of U.S. patent application Ser. No. 16/360,492 filed Mar. 21, 2019 issued as U.S. Pat. No. 11,109,228 filed Aug. 31, 2021, which claims priority to Japanese Patent Application No. 2018-068821, filed on Mar. 30, 2018, the entire contents of which are incorporated herein by reference.

TECHNICAL FIELD

The disclosure herein discloses a technique related to a communication device configured to establish a wireless connection with an external device.

BACKGROUND ART

A wireless communication scheme called Device Provisioning Protocol (hereinbelow termed as "DPP") scheme that is to be established by the Wi-Fi Alliance is known. The DPP scheme is a wireless communication scheme for easily establishing a Wi-Fi connection between a pair of devices. As an example of public key sharing, it is known that a Responder sends a public key to an Initiator by using Bluetooth (registered trademark) communication.

SUMMARY

In the above technique, there is no disclosure regarding restriction on sending the public key. Due to this, when the Responder sends the public key by using Bluetooth communication, a device which is different from the Initiator intended by a user may receive the public key. As a result, a Wi-Fi connection may be established between a pair of devices which the user does not intend.

The disclosure herein discloses a technique capable of suppressing a wireless connection from being established between a pair of devices which a user does not intend.

A communication device disclosed herein may comprise: a display unit; a first wireless interface; a second wireless interface different from the first wireless interface; a processor; and a memory storing computer-readable instructions therein, the computer-readable instructions, when executed by the processor, causing the communication device to: receive a specific signal from a first external device via the first wireless interface; in a case where the specific signal is received from the first external device, cause the display unit to display a first instruction screen for instructing that a target process which includes sending of a public key is to be executed; in a case where it is instructed that the target process is to be executed in a situation where the first instruction screen is displayed, send the public key to the first external device via the first wireless interface, wherein in a case where it is not instructed that the target process is to be executed in the situation where the first instruction screen is displayed, the public key is not sent; after the public key has been sent to the first external device, receive an authentication request in which the public key is used from the first external device via the second wireless interface; in a case where the authentication request is received from the first external device, send an authentication response to the first external device via the second wireless interface; after the authentication response has been sent to the first external device, receive connection information from the first external device via the second wireless interface, the connection information being for establishing a wireless connection between the communication device and a second external device via the second wireless interface; and in a case where the connection information is received from the first external device, establish, by using the connection information, the wireless connection between the communication device and the second external device via the second wireless interface.

Another communication device disclosed herein may comprise: a first wireless interface; a second wireless interface different from the first wireless interface; a processor; and a memory storing computer-readable instructions therein, the computer-readable instructions, when executed by the processor, causing the communication device to: receive a specific signal from a first external device via the first wireless interface; in a case where the specific signal is received from the first external device, determine whether a radio field intensity of the received specific signal is equal to or greater than a threshold value; in a case where it is determined that the radio field intensity is equal to or greater than the threshold value, send a public key to the first external device via the first wireless interface, wherein in a case where it is not determined that the radio field intensity is equal to or greater than the threshold value, sending of the public key to the first external device is restricted; after the public key has been sent to the first external device, receive an authentication request in which the public key is used from the first external device via the second wireless interface; in a case where the authentication request is received from the first external device, send an authentication response to the first external device via the second wireless interface; after the authentication response has been sent to the first external device, receive connection information from the first external device via the second wireless interface, the connection information being for establishing a wireless connection between the communication device and a second external device via the second wireless interface; and in a case where the connection information is received from the first external device, establish, by using the connection information, the wireless connection between the communication device and the second external device via the second wireless interface.

Computer programs for realizing the above communication devices, and non-transitory computer-readable recording media that store these computer programs are also novel and useful. Further, methods performed by the above communication devices are also novel and useful. In addition, communication systems comprising the above communication devices and another device (e.g., the first external device, the second external device) are also novel and useful.

EMBODIMENTS

First Embodiment

Figure 1:
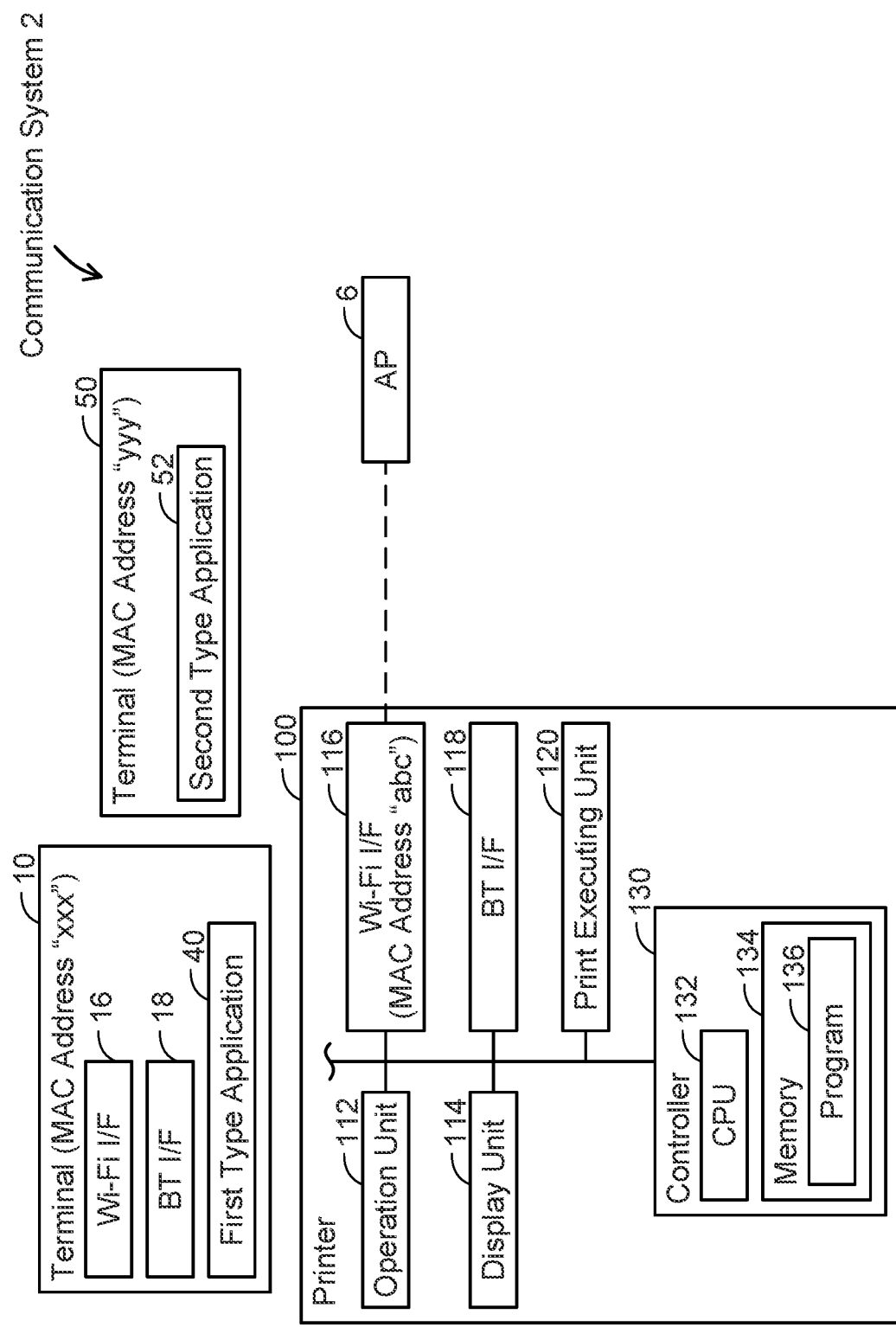
FIG. 1 shows a configuration of a communication system.

Configuration of Communication System 2; FIG. 1

As shown in FIG. 1, a communication system 2 includes an Access Point (AP) 6, a plurality of terminals 10, 50, and a printer 100. In this embodiment, a situation is assumed in which users use the terminals 10, 50 to establish a wireless connection according to a Wi-Fi scheme (hereinbelow termed "Wi-Fi connection") between the printer 100 and the AP 6.

Configurations of Terminals 10, 50

Each of the terminals 10, 50 is a mobile terminal device such as a cell phone (for example, a smartphone), a PDA, or a tablet PC. In a variant, each of the terminals 10, 50 may be a stationary PC or a laptop PC. The terminal 10 is assigned with a MAC address "xxx". The terminal 50 is assigned with a MAC address "yyy". Here, the respective terminals 10, 50 have a similar configuration. As such, hereinbelow, the configuration of the terminal 10 will mainly be described.

The terminal 10 includes a Wi-Fi interface 16 and a Bluetooth (BT) interface 18. Hereinbelow, an interface will simply be denoted as "I/F".

The Wi-Fi I/F 16 is a wireless interface configured to execute Wi-Fi communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 11ac, etc.), for example. The Wi-Fi I/F 16 especially supports a Device Provisioning Protocol (DPP) scheme that is to be established by the Wi-Fi Alliance. The DPP scheme is described in the standard draft "DRAFT Device Provisioning Protocol Technical Specification Version 0.2.11" created by the Wi-Fi Alliance, and is a wireless communication scheme for easily establishing a Wi-Fi connection between a pair of devices (such as the printer 100 and the AP 6) by using the terminal 10.

The BT I/F 18 is an I/F for executing communication according to a BT scheme version 4.0 or higher (communication according to so-called Blue Tooth Low Energy scheme). The BT scheme is a wireless communication scheme, for example, based on the standard of IEEE 802.15.1 and standards complying therewith.

The terminal 10 stores a first type application (which is hereinbelow termed simply as "first type app") 40. The first type app 40 is a program provided by a vendor of the printer 100, and is installed to the terminal 10, for example, from a server provided by the vendor of the printer 100 on the Internet. Further, the terminal 50 stores a second type application (which is hereinbelow termed simply as "second type app") 52. The second type app 52 is a program provided by an entity different from the vendor of the printer 100. The first type app 40 and the second type app 52 are both programs for establishing a Wi-Fi connection between the printer 100 and the AP 6. Further, in another variant, the second type app 52 may be an OS program for realizing basic operations of the terminal 50.

Configuration of Printer 100

The printer 100 is a peripheral (e.g., a peripheral of the terminal 10) capable of executing a print function. The printer 100 is provided with an operation unit 112, a display unit 114, a Wi-Fi I/F 116, a BT I/F 118, a print executing unit 120, and a controller 130. The respective units 112 to 130 are connected to a bus line (for which a reference sign is not given).

The operation unit 112 is provided with a plurality of keys. The user can input various instructions to the printer 100 by operating the operation unit 112. The display unit 114 is a display configured to display various types of information. The Wi-Fi I/F 116 is similar to the Wi-Fi I/F 16 of the terminal 10. That is, the Wi-Fi I/F 116 supports the DPP scheme. Further, the Wi-Fi I/F 116 is assigned with a MAC address "abc". The BT I/F 118 is similar to the BT I/F 18 of the terminal 10. The print executing unit 120 includes a print mechanism of an inkjet scheme or a laser scheme.

Here, differences between the Wi-Fi scheme and the BT scheme will be described. A communication speed of Wi-Fi communication (a maximum communication speed of 600 (Mbps), for example) is faster than a communication speed of BT communication (a maximum communication speed of 24 (Mbps), for example). A frequency of carrier waves used in Wi-Fi communication is 2.4 (GHz) band or 5.0 (GHz) band. A frequency of carrier waves used in BT communication is 2.4 (GHz) band. That is, in a case where the 5.0 (GHz) band is employed as the frequency of carrier waves in Wi-Fi communication, the frequency of carrier waves in Wi-Fi communication and the frequency of carrier waves in BT communication are different from each other. Further, a maximum distance with which Wi-Fi communication can be executed (about 100 (m), for example) is greater than a maximum distance with which BT communication can be executed (about several ten (m), for example).

The controller 130 includes a CPU 132 and a memory 134. The CPU 132 is configured to execute various processes according to a program 136 stored in the memory 134. The memory 134 is constituted of a volatile memory, a nonvolatile memory and the like.

Figure 2:
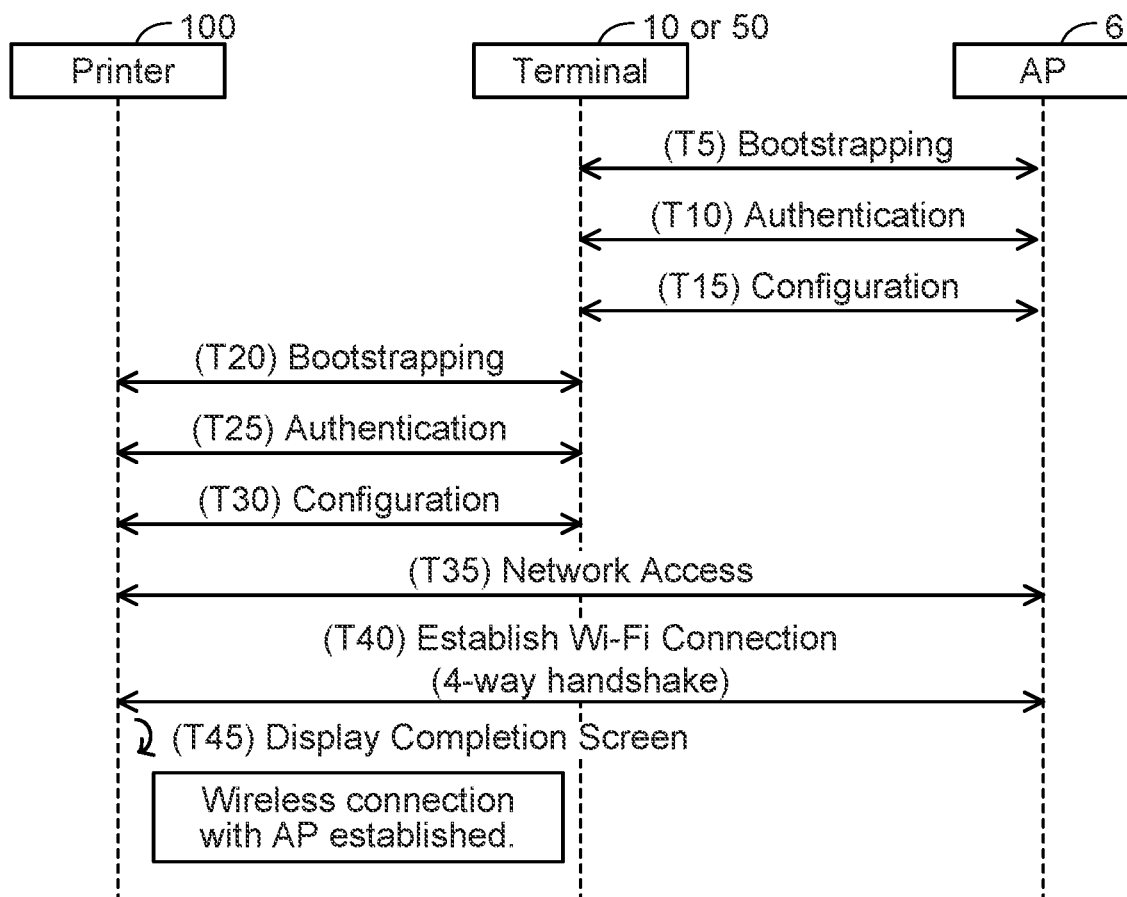
FIG. 2 shows an explanatory diagram explaining an overview of an embodiment.

Overview of Embodiment; FIG. 2

Next, an overview of the present embodiment will be described with reference to FIG. 2. Although it has been described that each of the terminals 10, 50 and the printer 100 supports the DPP scheme, the AP 6 also supports the DPP scheme. Further, in this embodiment, a Wi-Fi connection is established between the printer 100 and the AP 6 by each of the devices 6, 10 (or 50), 100 executing communication according to the DPP scheme. Processes executed by the terminal 10 and processes executed by the terminal 50 are similar to each other except for some of the processes (such as T714 of FIGS. 11 and T814 of FIG. 8 to be described later). As such, description regarding the terminal 50 will be omitted in FIG. 2. Further, hereinbelow, to facilitate understanding, operations which are executed by CPUs (such as the CPU 132) of the respective devices will not be described with the CPUs as the subjects of action, but with the respective devices (such as the printer 100) as the subjects of action.

In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code (registered trademark) adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6. As a result, the first CO is stored in the AP 6.

Next, in T20, the terminal 10 executes a BS according to the DPP scheme with the printer 100. This BS is a process for the printer 100 to provide information, which is to be used in Auth of T25 to be described later, to the terminal 10 via the BT I/F 118.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100. As a result, the second CO is stored in the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6.

In T40, the printer 100 and the AP 6 execute 4way-handshake communication. In at least a part of the 4way-handshake communication, the printer 100 and the AP 6 communicate encrypted information encrypted by the connection key shared in the NA in T35. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In T45, the printer 100 causes the display unit 114 to display a completion screen indicating that the Wi-Fi connection has been established with the AP 6. When the process of T45 is completed, the process of FIG. 2 is terminated.

In the DPP scheme, in order to establish the Wi-Fi connection between the printer 100 and the AP 6, the user does not need to input information of the wireless network in which the AP 6 operates as a parent station (such as a Service Set Identifier (SSID) and a password) to the printer 100. As such, the user can easily establish the Wi-Fi connection between the printer 100 and the AP 6.

Description on Respective Processes; FIGS. 3 to 7

Next, details of the respective processes executed in T20 to T35 of FIG. 2 will be described with reference to FIGS. 3 to 7. Since the processes of T5 to T15 are similar to the processes of T20 to T30 except that the AP 6 is used instead of the printer 100, the detailed description thereof will be omitted. Further, FIG. 3 and FIG. 7 respectively show different cases of the BS executed between the terminal 10 and the printer 100. These cases are processes executed in one embodiment.

Figure 3:
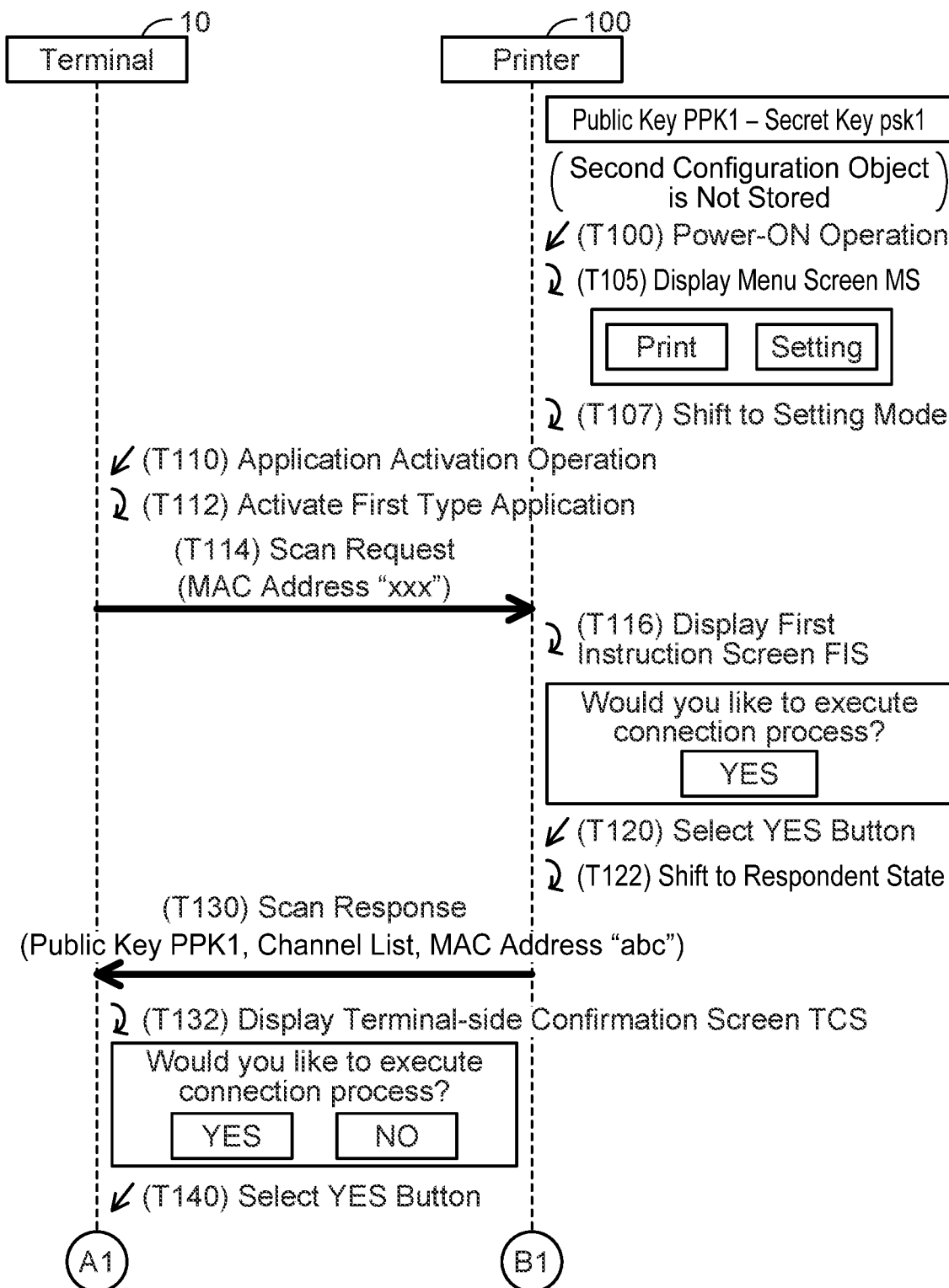
FIG. 3 shows a sequence diagram of a Bootstrapping process of Case A.

Bootstrapping (BS) of Case A; FIG. 3

Firstly, a process of the BS of Case A in T20 of FIG. 2 will be described with reference to FIG. 3. In an initial state of FIG. 3, the memory 134 of the printer 100 stores in advance a public key PPK1 and a secret key psk1 of the printer 100.

In response to accepting a power-ON operation by the user in T100, the printer 100 causes the display unit 114 to display a menu screen MS in T105. The screen MS is a default screen of the printer 100 in other words, and includes a print button for causing the printer 100 to execute print and a setting button for designating various settings (such as print setting) of the printer 100.

Next, since the memory 134 has not yet stored the second CO (see T30 of FIG. 2), the printer 100 supplies the BT I/F 118 with a shifting instruction for shifting an operation mode of the BT I/F 118 and shifts the operation mode of the BT I/F 118 from a normal mode to a setting mode in T107. As such, in the state where the memory 134 does not store the second CO, the operation mode of the BT I/F 118 is shifted from the normal mode to the setting mode by the user simply turning on the power of the printer 100. The normal mode is a mode in which a Scan Request (hereinbelow simply termed as "SReq"; T114 to be described later) according to the BT scheme cannot be interpreted (that is, a mode in which even if an SReq is received, the SReq is ignored). The setting mode is a mode in which the SReq can be interpreted (that is, a mode in which when an SReq is received, information in the SReq is supplied to the CPU 132).

In response to accepting an app activation operation by the user in T110, the terminal 10 activates the first type app 40 in T112. Respective processes hereafter executed by the terminal 10 are realized by the first type app 40. Next, in T114, the terminal 10 sends an SReq including the MAC address "xxx" of the Wi-Fi I/F 16 to the printer 100 via the BT I/F 18. This SReq is a signal that can be communicated with a device even when pairing with this device, which is a communication target, has not yet been completed.

In response to receiving the SReq from the terminal 10 via the BT I/F 118 in T114, the printer 100 causes the display unit 114 to display a first instruction screen FIS for instructing to execute a connection process for establishing the Wi-Fi connection in T116. The screen FIS includes a YES button indicating that the connection process is to be executed.

In response to the YES button in the screen FIS being selected by the user in T120, the printer 100 shifts from a non-respondent state to a respondent state in T122. The non-respondent state is a state in which the Wi-Fi I/F 116 does not send a DPP Authentication Response (hereinbelow simply termed "ARes") (see T210 of FIG. 4 to be described later) even if a DPP Authentication Request (hereinbelow simply termed "AReq") is received from the terminal 10 (see T200 to be described later). The respondent state is a state in which the Wi-Fi I/F 116 sends the ARes to the terminal 10 in response to receiving the AReq from the terminal 10. That is, the printer 100 shifts to a state of being able to execute the Auth (see T25 of FIG. 2) by shifting from the non-respondent state to the respondent state. Specifically, in this embodiment, the non-respondent state is a state in which even if the Wi-Fi I/F 116 receives a signal from outside, it does not supply the signal to the CPU 132. Further, the respondent state is a state in which in response to receiving a signal from outside, the Wi-Fi I/F 116 supplies the signal to the CPU 132 and sends a response for this signal. Since the respondent state is a state in which the CPU 132 processes the signal received from outside, processing load in that state is higher than that in the non-respondent state. In a variant, the non-respondent state may be a state in which electricity is not supplied to the Wi-Fi I/F 116, and the respondent state may be a state in which electricity is supplied to the Wi-Fi I/F 116. Further, in another variant, the non-respondent state may be a state in which even if the Wi-Fi I/F 116 receives the AReq from outside, the Wi-Fi I/F 116 does not supply a notification that the AReq has been received to the CPU 132, and the respondent state may be a state in which in response to receiving the AReq from outside, the Wi-Fi I/F 116 supplies a notification that the AReq has been received to the CPU 132.

In a case where the YES button is not selected within a predetermined time since the printer 100 started to display the first instruction screen FIS in T116 (that is, in a case of a timeout), the printer 100 terminates displaying the screen FIS and does not execute the processes from T120, and returns to a state of displaying the menu screen MS. In a variant, the screen FIS may include a NO button indicating that the connection process is not to be executed, and the printer 100 may terminate displaying the screen FIS in a case where the NO button in the screen FIS is selected by the user.

Next, in T130, the printer 100 sends a Scan Response (hereinbelow simply termed "SRes") according to the BT scheme to the terminal 10 via the BT I/F 118. This SRes is a signal that can be communicated with a device even when pairing with this device, which is a communication target, has not yet been completed. Further, the SRes includes the public key PPK1 stored in the memory 134 in advance, a channel list stored in the memory 134 in advance, and the MAC address "abc" of the Wi-Fi I/F 116. The channel list is a list of values of a plurality of communication channels to be used in the Auth (see T25 of FIG. 2).

In response to receiving the SRes from the printer 100 in T130 via the BT I/F 18, the terminal 10 obtains respective information in the SRes (that is, the public key PPK1, the channel list, and the MAC address "abc"). Then, in T132, the terminal 10 displays a terminal-side confirmation screen TCS for inquiring the user whether or not to execute a connection process for establishing the Wi-Fi connection between the printer 100 and the AP 6. The screen TCS includes a YES button indicating that the connection process is to be executed and a NO button indicating that the connection process is not to be executed. In T140, the terminal 10 accepts a selection of the YES button in the screen TCS by the user. When the process of T140 is completed, the process of the BS of Case A is terminated.

Figure 4:
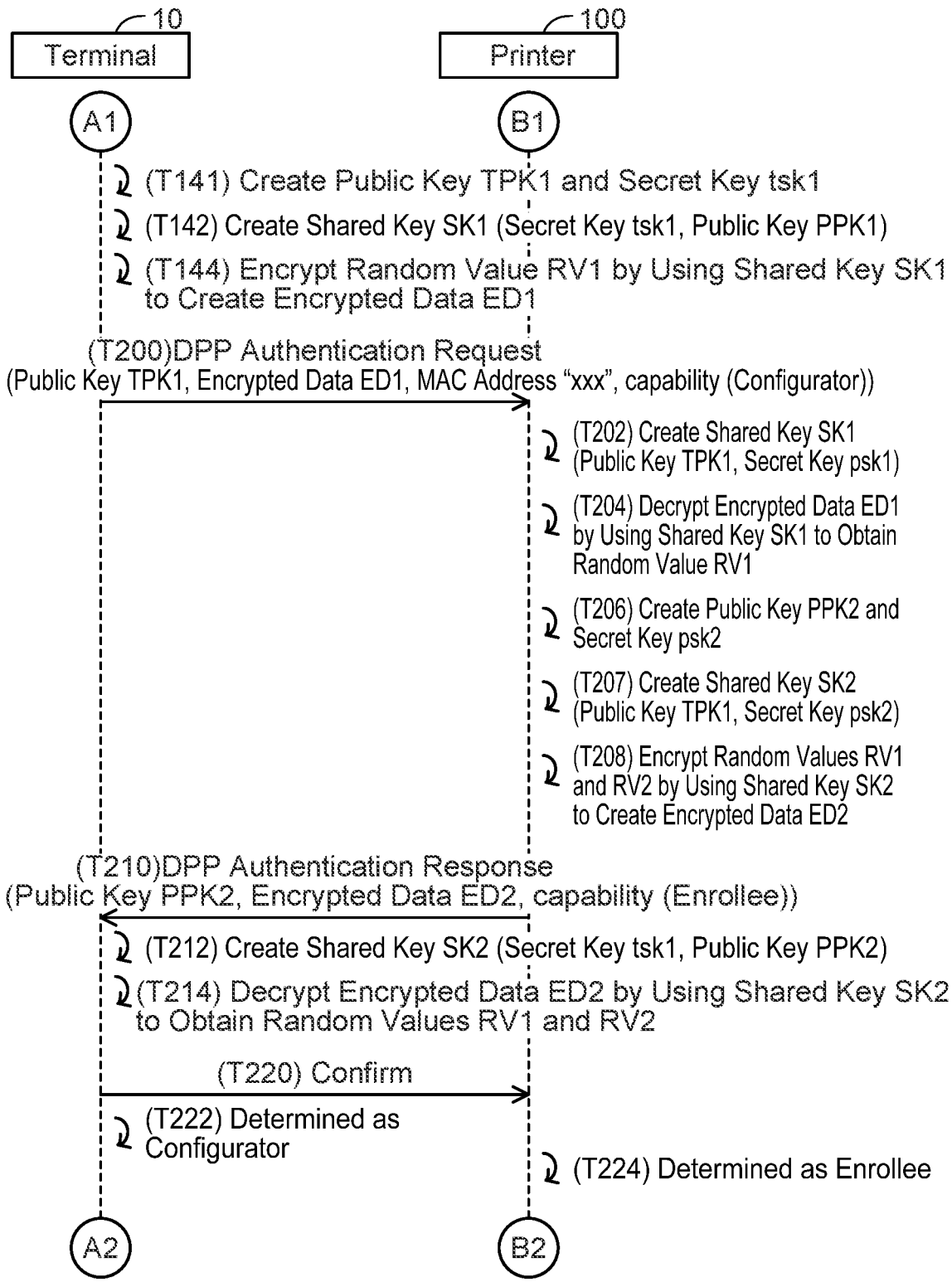
FIG. 4 shows a sequence diagram of an Authentication process.

(Authentication (Auth); FIG. 4)

Next, the process of the Auth in T25 of FIG. 2 will be described with reference to FIG. 4. In response to the YES button in the screen TCS being selected by the user in T140 of FIG. 3, the terminal 10 creates a public key TPK1 and a secret key tsk1 of the terminal 10 in T141. Next, in T142, the terminal 10 creates a shared key SK1 according to Elliptic curve Diffie—Hellman key exchange (ECDH) by using the created secret key tsk1 and the public key PPK1 of the printer 100 obtained in T130 of FIG. 3. Then, in T144, the terminal 10 creates encrypted data ED1 by using the created shared key SK1 to encrypt a random value RV1.

In T200, the terminal 10 sends an AReq via the Wi-Fi I/F 16 to the printer 100 by setting the MAC address "abc" obtained in T130 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T130. The AReq includes the public key TPK1 of the terminal 10 created in T141, the encrypted data ED1 created in T144, and a capability of the terminal 10.

The capability is information that is pre-designated in a device supporting the DPP scheme, and includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO used in the NA (T35 of FIG. 2) to an Enrollee in the Config (T30 of FIG. 2). On the other hand, the Enrollee refers to a device that receives the CO used in the NA from the Configurator in the Config. As above, in this embodiment, the terminal 10 creates the first and second COs and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T200. As above, this AReq is sent with the MAC address "abc" of the printer 100 as the destination. As such, the printer 100 can suitably receive this AReq from the terminal 10.

Further, when the printer 100 shifts to the respondent state in T122 of FIG. 3, it monitors receipt of the AReq by using one communication channel among the plurality of communication channels in the channel list. As above, the AReq in T200 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T202, the printer 100 creates a shared key SK1 according to the ECDH by using the public key TPK1 of the terminal 10 in the AReq and the secret key psk1 of the printer 100 stored in advance in the memory 134.

Here, the shared key SK1 created by the terminal 10 in T142 and the shared key SK1 created by the printer 100 in T204 are identical to each other. Thus, the printer 100 can suitably decrypt the encrypted data ED1 in the AReq by using the created shared key SK1 in T204, as a result of which it can obtain the random value RV1. In a case where decryption of the encrypted data ED1 succeeds, the printer 100 determines that the sender of the AReq is the sender device of the SReq received in T114 of FIG. 3, that is, determines that the authentication succeeded, and executes processes from T206. On the other hand, in a case where the decryption of the encrypted data ED1 does not succeed, the printer 100 determines that the sender of the AReq is not the sender device of the SReq received in T114, that is, determines that the authentication failed, and does not execute the processes from T206.

In T206, the printer 100 creates a new public key PPK2 and a new secret key psk2 of the printer 100. In a variant, the public key PPK2 and the secret key psk2 may be stored in advance in the memory 134. Next, in T207, the printer 100 creates a shared key SK2 according to the ECDH by using the public key TPK1 of the terminal 10 in the AReq of T200 and the created secret key psk2 of the printer 100. Then, in T208, the printer 100 creates encrypted data ED2 by using the created shared key SK2 to encrypt the obtained random value RV1 and a new random value RV2.

In T210, the printer 100 sends an ARes to the terminal 10 via the Wi-Fi I/F 116. This ARes includes the public key PPK2 of the printer 100 created in T206, the encrypted data ED2 created in T208, and a capability of the printer 100. This capability includes the value indicating that the printer 100 is capable of operating only as the Enrollee.

In response to receiving the ARes from the printer 100 via the Wi-Fi I/F 16 in T210, the terminal 10 executes following processes for authenticating the sender of the ARes (that is, the printer 100). Specifically, firstly in T212, the terminal 10 creates a shared key SK2 according to the ECDH by using the secret key tsk1 of the terminal 10 created in T141 and the public key PPK2 of the printer 100 in the ARes. Here, the shared key SK2 created by the printer 100 in T207 and the shared key SK2 created by the terminal 10 in T212 are identical to each other. Thus, the terminal 10 can suitably decrypt the encrypted data ED2 in the ARes by using the created shared key SK2 in T214, as a result of which it can obtain the random values RV1 and RV2. In a case where decryption of the encrypted data ED2 succeeds, the terminal 10 determines that the sender of the ARes is the sender device of the SRes received in T130 of FIG. 3, that is, determines that the authentication succeeded, and executes processes from T220. On the other hand, in a case where the decryption of the encrypted data ED2 does not succeed, the terminal 10 determines that the sender of the ARes is not the sender device of the SRes received in T130, that is, determines that the authentication failed, and does not execute the processes from T220.

In T220, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T222, and the printer 100 determines to operate as the Enrollee in T224. When the process of T224 is completed, the process of FIG. 4 is terminated.

Figure 5:
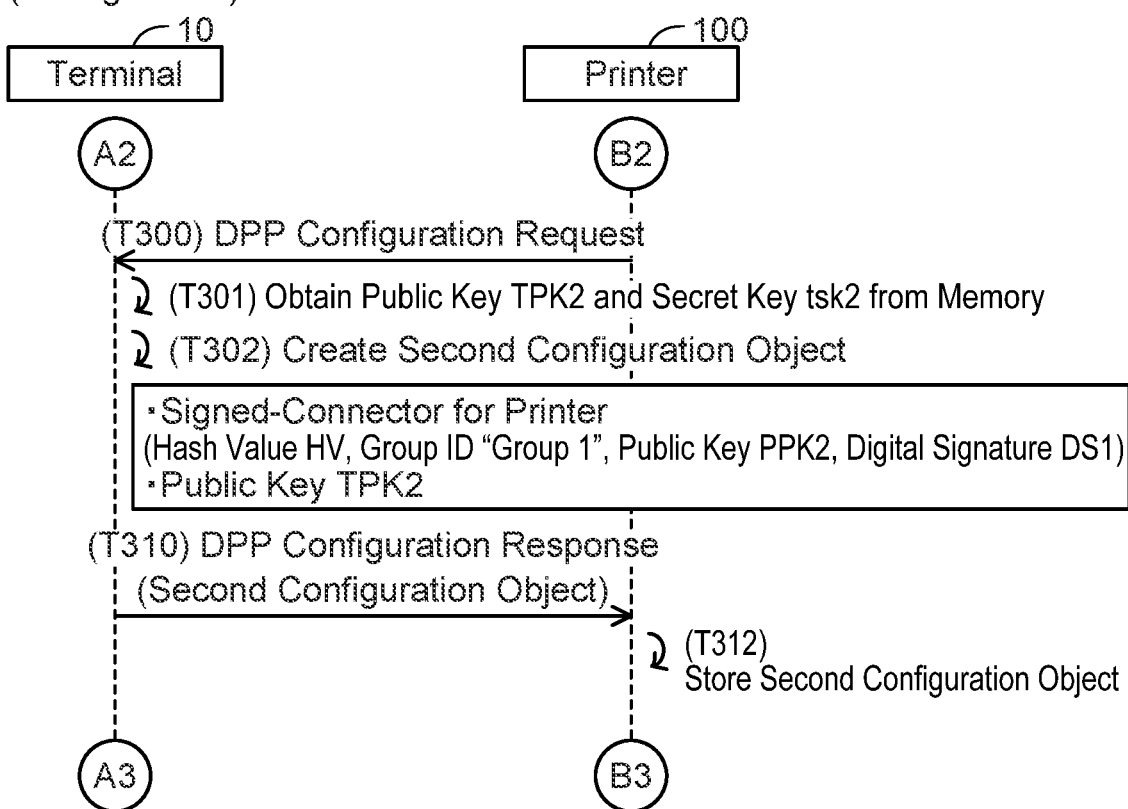
FIG. 5 shows a sequence diagram of a Configuration process.

Configuration (Config); FIG. 5

Next, the process of Config in T30 of FIG. 2 will be described with reference to FIG. 5. In T300, the printer 100 sends a DPP Configuration Request (hereinbelow termed simply as "CReq") to the terminal 10 via the Wi-Fi I/F 116. This CReq is a signal requesting the CO (that is, the information for establishing the Wi-Fi connection between the printer 100 and the AP 6) to be sent.

The terminal 10 receives the CReq from the printer 100 in T300 via the Wi-Fi I/F 16. In this case, the terminal 10 obtains a group ID "Group1", a public key TPK2, and a secret key tsk2 from a memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO (see T30 of FIG. 2). Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group 1", and the public key PPK2 of the printer 100 in the ARes in T210 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SCont") including the hash value HV, the group ID "Group 1", the public key PPK2 of the printer 100, and the digital signature DS1. Further, the terminal 10 creates the second CO including the SCont for printer and the public key TPK2 of the terminal 10.

In T310, the terminal 10 sends a DPP Configuration Response (hereinbelow termed simply as "CRes") including the second CO to the printer 100 via the Wi-Fi I/F 16.

The printer 100 receives the CRes from the terminal 10 in T310 via the Wi-Fi I/F 116. In this case, the printer 100 stores the second CO in the CRes in the memory 134 in T312. When the process of T312 is completed, the process of FIG. 5 is terminated.

Figure 6:
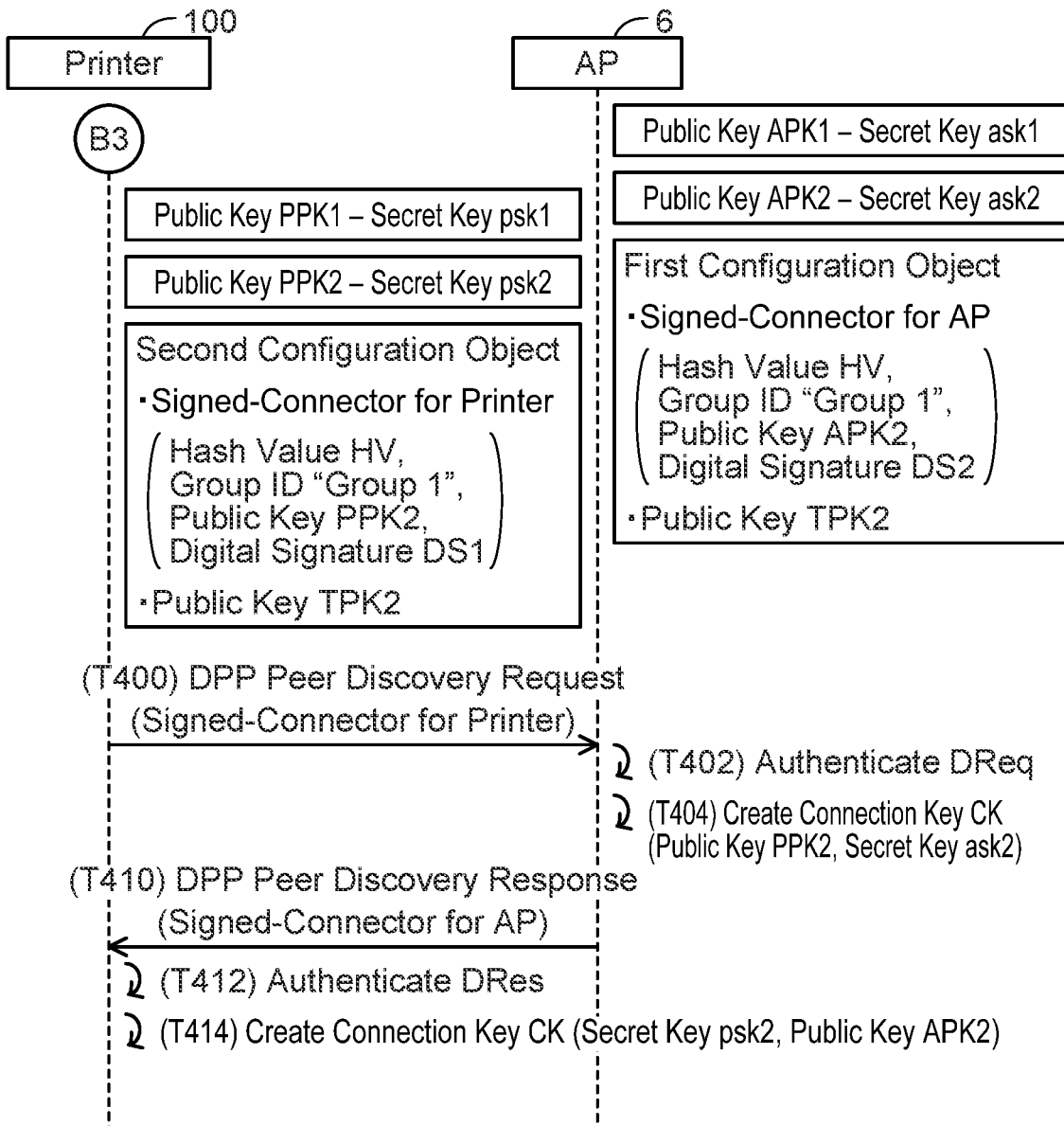
FIG. 6 shows a sequence diagram of a Network Access process.

Network Access (NA); FIG. 6

As aforementioned, the processes of T5 to T15 of FIG. 2 have already been executed between the terminal 10 and the AP 6, similarly to T20 to T30 of FIG. 2. However, the AP 6 does not execute the processes of T105 to T124 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T134 are executed between the terminal 10 and the AP 6 when the terminal 10 captures this QR code. As a result, the AP 6 stores a public key APK2 and a secret key ask2 of the AP 6 (see T206 of FIG. 4), and further stores the first CO received from the terminal 10 (see T312 of FIG. 5). The first CO includes a SCont for AP and a public key TPK2 of the terminal 10. This public key TPK2 is identical to the public key TPK2 included in the second CO. Further, the SCont for AP includes a hash value HV, a group ID "Group1", the public key APK2 of the AP 6, and a digital signature DS2. This hash value HV and this group ID "Group 1" are respectively identical to the hash value HV and the group ID "Group 1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SCont for printer to the AP 6 via the Wi-Fi I/F 116. This DReq is a signal requesting the AP 6 to execute authentication and send the SCont for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SCont for printer are respectively identical to the hash value HV and the group ID "Group 1" in the SCont for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SCont for printer is identical to the hash value HV in the SCont for AP included in the stored first CO means that the SCont for printer and the SCont for AP were created by the same device (that is, the terminal 10). As such, the AP 6 also determines that authentication of the creator of the received SCont for printer (that is, the terminal 10) succeeds. Further, the AP 6 decrypts the digital signature DS1 in the received SCont for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SCont for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP6 determines "identical" in the second AP determination process means that the information in the received SCont for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication fails and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SCont for AP to the printer 100.

In response to receiving the DRes from the AP 6 in T410 via the Wi-Fi I/F 116, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group 1" in the received SCont for AP are respectively identical to the hash value HV and the group ID "Group1" in the SCont for printer included in the stored second CO. In the case of FIG. 6, the printer 100 determines "identical" in the first PR determination process, thus it determines that the authentication of the sender of the DRes (that is, the AP 6) succeeds. The fact that the hash value HV in the received SCont for AP is identical to the hash value HV in the SCont for printer included in the stored second CO means that the SCont for printer and the SCont for AP were created by the same device (that is, the terminal 10). As such, the printer 100 also determines that authentication of the creator of the received SCont for AP (that is, the terminal 10) succeeds. Further, the printer 100 decrypts the digital signature DS2 in the received SCont for AP by using the public key TPK2 of the terminal 10 included in the stored second CO. Since the decryption of the digital signature DS2 succeeds in the case of FIG. 6, the printer 100 executes a second PR determination process that is regarding whether or not a specific value obtained by decrypting the digital signature DS2 is identical to a value obtained by hashing the information in the received SCont for AP (that is, the hash value HV, the "Group 1", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the information in the received SCont for AP (that is, the hash value HV, the "Group1", and the public key APK2) has not been tampered by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication fails and does not execute the processes from T414.

In T414, the printer 100 creates a connection key CK by using the stored secret key psk2 of the printer 100 and the public key APK2 of the AP 6 in the received SCont for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 the AP 6. When T414 is completed, the process of FIG. 6 is terminated.

As aforementioned, after the connection key CK is shared between the printer 100 and the AP 6, the printer 100 and the AP 6 execute the 4way-handshake communication by using the connection key CK in T40 of FIG. 2. As a result, the Wi-Fi connection is established between the printer 100 and the AP 6. As aforementioned, the printer 100 receives the AReq in T200 of FIG. 4 from the terminal 10 by using one communication channel among the plurality of communication channels included in the channel list of the printer 100. That is, the printer 100 receives the AReq in T200 from the terminal 10 by using the communication channel which both the printer 100 and the terminal 10 can use. On the other hand, in T40 of FIG. 2, the printer 100 establishes the Wi-Fi connection with the AP 6 by using the communication channel which both the printer 100 and the AP 6 can use. Here, the communication channel which the terminal 10 can use and the communication channel which the AP 6 can use may differ in some cases. In this embodiment, the communication channel by which the printer 100 receives the AReq from the terminal 10 in T200 of FIG. 4 is different from the communication channel by which the printer 100 establishes the Wi-Fi connection with the AP 6 in T40 of FIG. 2. However, in a variant, the former communication channel may be same as the latter communication channel.

Figure 7:
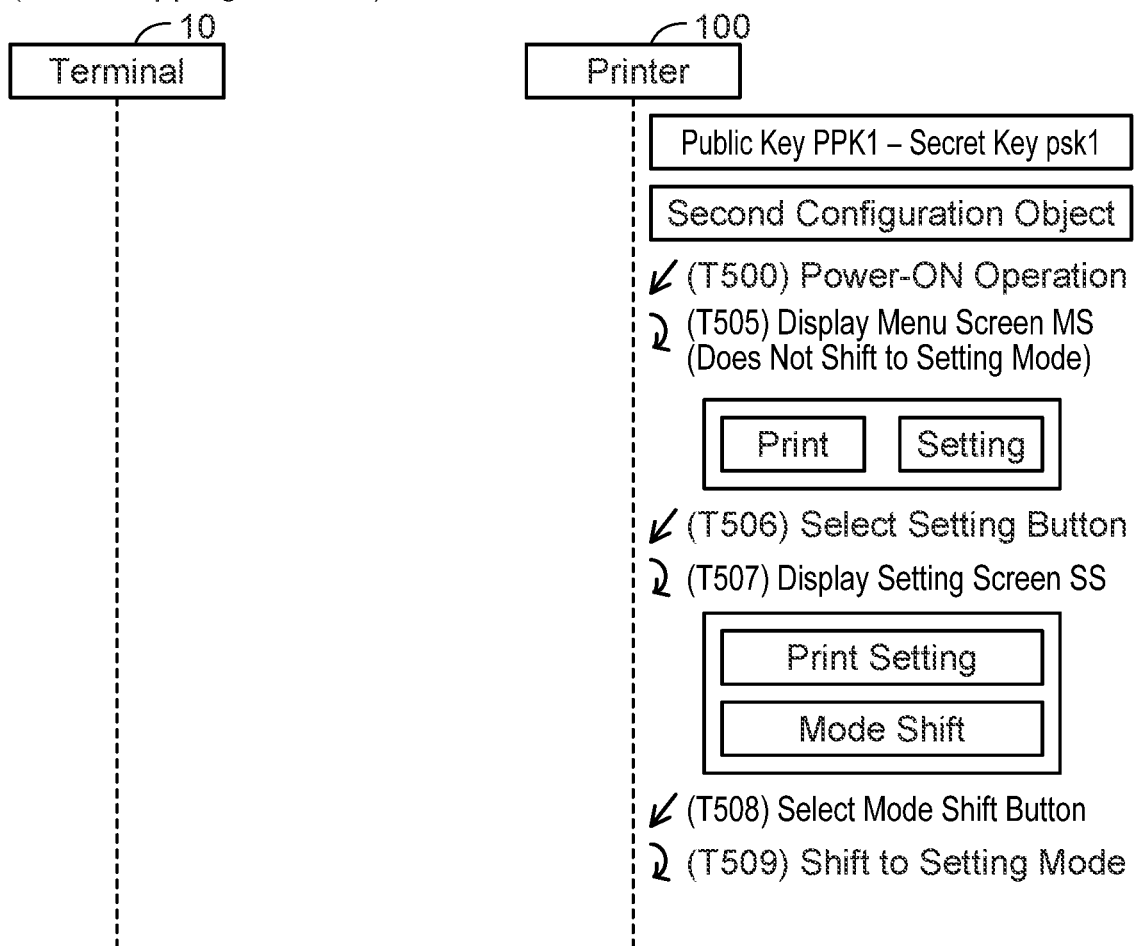
FIG. 7 shows a sequence diagram of a Bootstrapping process of Case B.

Bootstrapping (BS) of Case B; FIG. 7

Next, a process of the BS of Case B will be described with reference to FIG. 7. Case B is a state after T5 to T40 of FIG. 2 are executed, that is, a state in which the memory 134 of the printer 100 has already stored the second CO.

T500 and T505 are similar to T100 and T105 of FIG. 3. In the present case, since the memory 134 of the printer 100 stores the second CO, the printer 100 does not shift the operation mode of the BT I/F 118 from the normal mode to the setting mode. In the situation where the second CO is stored, the printer 100 can establish the Wi-Fi connection with the AP 6 by using the second CO. As such, a possibility that the BS is executed in the printer 100 is low. Under such a situation, the printer 100 does not shift the operation mode of the BT I/F 118 to the setting mode. Thus, even if the SReq is sent from the terminal 10 to the printer 100, the SReq is not supplied from the BT I/F 118 to the CPU 132, as a result of which the first instruction screen FIS is not displayed in the printer 100. Thus, the processing load on the printer 100 can be reduced.

In the state where the printer 100 stores the second CO, the user may wish to establish a Wi-Fi connection between the printer 100 and an AP different from the AP 6, for example. In this case, the user selects the setting button in the menu screen MS in T506. In this case, the printer 100 causes the display unit 114 to display a setting screen SS in T507. The screen SS includes a print setting button for changing print settings of the printer 100 and a mode shift button for changing the operation mode of the BT I/F 118. Then, in T508, the user selects the mode shift button in the screen SS. In this case, the printer 100 shifts the operation mode of the BT I/F 118 from the normal mode to the setting mode in T509. Due to this, the printer 100 can execute processes similar to those from T114 of FIG. 3 in response to receiving the SReq from the terminal 10.

The printer 100 can also establish the Wi-Fi connection with the AP 6 according to a normal Wi-Fi scheme (that is, a scheme that uses an SSID and a password) without using the DPP scheme. In this case, the memory 134 of the printer 100 stores wireless setting information (that is, the SSID and the password) for establishing the Wi-Fi connection with the AP 6. Even when the power of the printer 100 is turned on under such a state, the printer 100 does not shift the operation mode of the BT I/F 118 from the normal mode to the setting mode, similarly to Case B of FIG. 7. This is because the printer 100 can establish the Wi-Fi connection with the AP 6 by using the wireless setting information. Due to this, even when the SReq is sent from the terminal 10 to the printer 100, the first instruction screen FIS is not displayed in the printer 100. The processing load on the printer 100 can be reduced.

Effects of Embodiment

Here, a printer according to a comparative example is assumed in which the first instruction screen FIS is not displayed in response to this printer receiving an SReq from the terminal 10. Further, for example, a situation is assumed in which the user of the terminal 10 wishes to establish a Wi-Fi connection between the AP 6 and a printer that is different from the printer according to the comparative example, that is, a situation is assumed in which the user does not wish to have communication according to the DPP scheme executed between the terminal 10 and the printer according to the comparative example. In this case, in response to receiving an SReq from the terminal 10, the printer according to the comparative example automatically executes processes similar to the processes from T122 of FIG. 3 and sends an SRes to the terminal 10. That is, the printer according to the comparative example sends the SRes to the terminal 10 in response to receiving the SReq from the terminal 10, even when the user's instruction is not accepted. In this case, a Wi-Fi connection may be established between the printer according to the comparative example and the AP 6. That is, a Wi-Fi connection may be established between a pair of devices (that is, the printer according to the comparative example and the AP 6) which the user of the terminal 10 does not intend.

Contrary to this, the printer 100 according to the present embodiment displays the first instruction screen FIS (T116) in the case of receiving the SReq from the terminal 10 (T114 of FIG. 3). Due to this, in the case where the YES button in the screen FIS is selected by the user (T120), that is, in the case where the user wishes to have communication according to the DPP scheme (that is, communication in which the public key PPK1 is used) executed between the printer 100 and the terminal 10, the printer 100 sends the SRes including the public key PPK1 and the like to the terminal 10 (T130). As a result, the printer 100 receives the AReq from the terminal 10 (T200 of FIG. 4), sends the ARes to the terminal 10 (T210), receives the second CO from the terminal 10 (T310 of FIG. 5), and establishes the Wi-Fi connection with the AP 6 by using the second CO (T35, T40 of FIG. 2). Due to this, the Wi-Fi connection can be established between the pair of devices (that is, the printer 100 and the AP 6) intended by the user of the terminal 10. On the other hand, in the case where the YES button in the screen FIS is not selected, that is, in the case where the user does not wish to have communication according to the DPP scheme executed between the printer 100 and the terminal 10, the SRes including the public key PPK1 and the like is not sent. As such, the printer 100 does not receive the AReq from the terminal 10, as a result of which the Wi-Fi connection with the AP 6 is not established. Due to this, establishment of the Wi-Fi connection between the pair of devices (that is, the printer 100 and the AP 6) that is not intended by the user of the terminal 10 can be prevented.

Corresponding Relationships

The printer 100, the terminal 10, and the AP 6 are respectively examples of "communication device", "first external device", and "second external device". The BT I/F 118 and the Wi-Fi I/F 116 are respectively examples of "first wireless interface" and "second wireless interface". The SReq in T114 of FIG. 3 and the public key PPK1 of the printer 100 are respectively examples of "specific signal" and "public key". The AReq, the ARes, and the second CO are respectively examples of "authentication request", "authentication response", and "connection information". The Wi-Fi connection established in T40 of FIG. 2 is an example of "wireless connection".

The channel list, the communication channel used in T200 of FIG. 4, and the communication channel used in T40 of FIG. 2 are respectively examples of "communication channel information", "first communication channel", and "second communication channel". Accepting the power-ON operation by the user in the state where the second CO is not stored in the memory 134 and accepting the selection of the mode shift button by the user in the state where the second CO is stored in the memory 134 are examples of "predetermined condition". The normal mode and the setting mode are respectively examples of "first mode" and "second mode". The SCont for AP and the hash value HV in the second CO are respectively examples of "received information" and "authentication information".

The process of T114 of FIG. 3, the process of T116, the process of T130, the process of T200 of FIG. 4, the process of T210, the process of T310 of FIG. 5, and the processes of T35 and T40 of FIG. 2 are respectively examples of "receive specific signal", "cause the display unit to display a first instruction screen", "send the public key to the first external device via the first wireless interface", "receive an authentication request", "send an authentication response", "receive connection information", and "establish the wireless connection between the communication device and the second external device via the second wireless interface".

Second Embodiment; FIGS. 8 to 12

Next, a second embodiment will be described. The second embodiment differs in processes executed by the printer 100 in the BS and the Auth.

Figure 8:
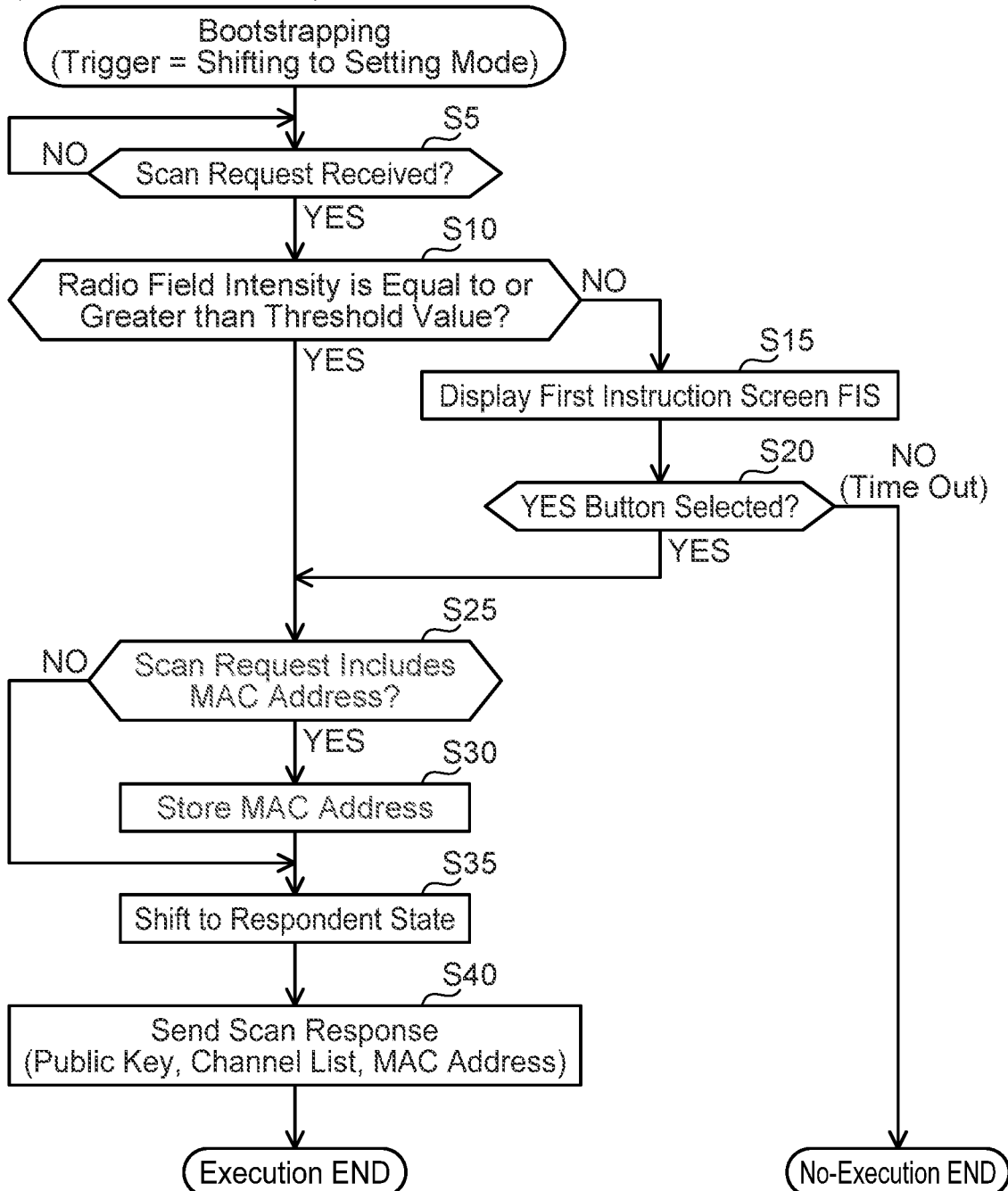
FIG. 8 shows a flowchart of a Bootstrapping process according to a second embodiment.

BS Process; FIG. 8

Firstly, details of a process executed by the printer 100 in the BS in T20 of FIG. 2 will be described with reference to FIG. 8. The process of FIG. 8 is executed in the case where the operation mode of the BT I/F 118 is shifted from the normal mode to the setting mode.

In S5, the printer 100 monitors receipt of the SReq via the BT I/F 118. Specifically, the printer 100 (that is, the CPU 132) determines YES in S5 in a case where the SReq is obtained from the BT I/F 118, and proceeds to S10. Hereinbelow, the sender terminal of this SReq will be termed "target terminal".

In S10, the printer 100 obtains a radio field intensity of the received SReq, and determines whether or not this radio field intensity is equal to or greater than a threshold value. This threshold value may be a value preset by the vendor of the printer 100 upon shipping of the printer 100, or may be a value designated by the user after the shipping of the printer 100. The BT I/F 118 specifies the radio field intensity of the received SReq upon receiving the SReq, and supplies the specified radio field intensity to the printer 100 (that is, the CPU 132). Due to this, the printer 100 (that is, the CPU 132) can obtain the radio field intensity. In a case of determining that the obtained radio field intensity is equal to or greater than the threshold value, the printer 100 determines YES in S10 and proceeds to S25. On the other hand, in a case of determining that the obtained radio field intensity is less than the threshold value, the printer 100 determines NO in S10 and proceeds to S15.

In S15, the printer 100 causes the display unit 114 to display the first instruction screen FIS. This screen FIS is identical to the first instruction screen FIS in T116 of FIG. 3. That is, this screen FIS includes the YES button indicating that the connection process is to be executed.

In S20, the printer 100 determines whether or not the YES button in the screen FIS has been selected. In a case where the YES button in the screen FIS is selected by the user, the printer 100 determines YES in S20 and proceeds to S25. On the other hand, in a case where the YES button is not selected within a predetermined time since the screen FIS started to be displayed in S15 (that is, in a case of a timeout), the printer 100 determines NO in S20 and terminates the process of FIG. 8 as no-execution END without executing processes from S25. The no-execution END means to cancel the process according to the DPP scheme.

In S25, the printer 100 determines whether or not the SReq obtained in S5 from the BT I/F 118 includes a MAC address of the target terminal. The printer 100 determines YES in S25 in a case where the SReq includes the MAC address, stores the MAC address in the memory 134 in S30, and proceeds to S35. On the other hand, the printer 100 determines NO in S25 in a case where the SReq does not include the MAC address, and proceeds to S35.

In S35, the printer 100 shifts from the non-respondent state to the respondent state. In a case of already operating in the respondent state, the printer 100 skips the process of S35 and proceeds to S40.

In S40, the printer 100 sends the SRes to the target terminal via the BT I/F 118. This SRes includes the public key PPK1 of the printer 100, the channel list stored in the memory 134 in advance, and the MAC address "abc" of the Wi-Fi I/F 116. When the process of S40 is completed, the process of FIG. 8 is terminated as an execution END by which the Auth process is executed.

Figure 9:
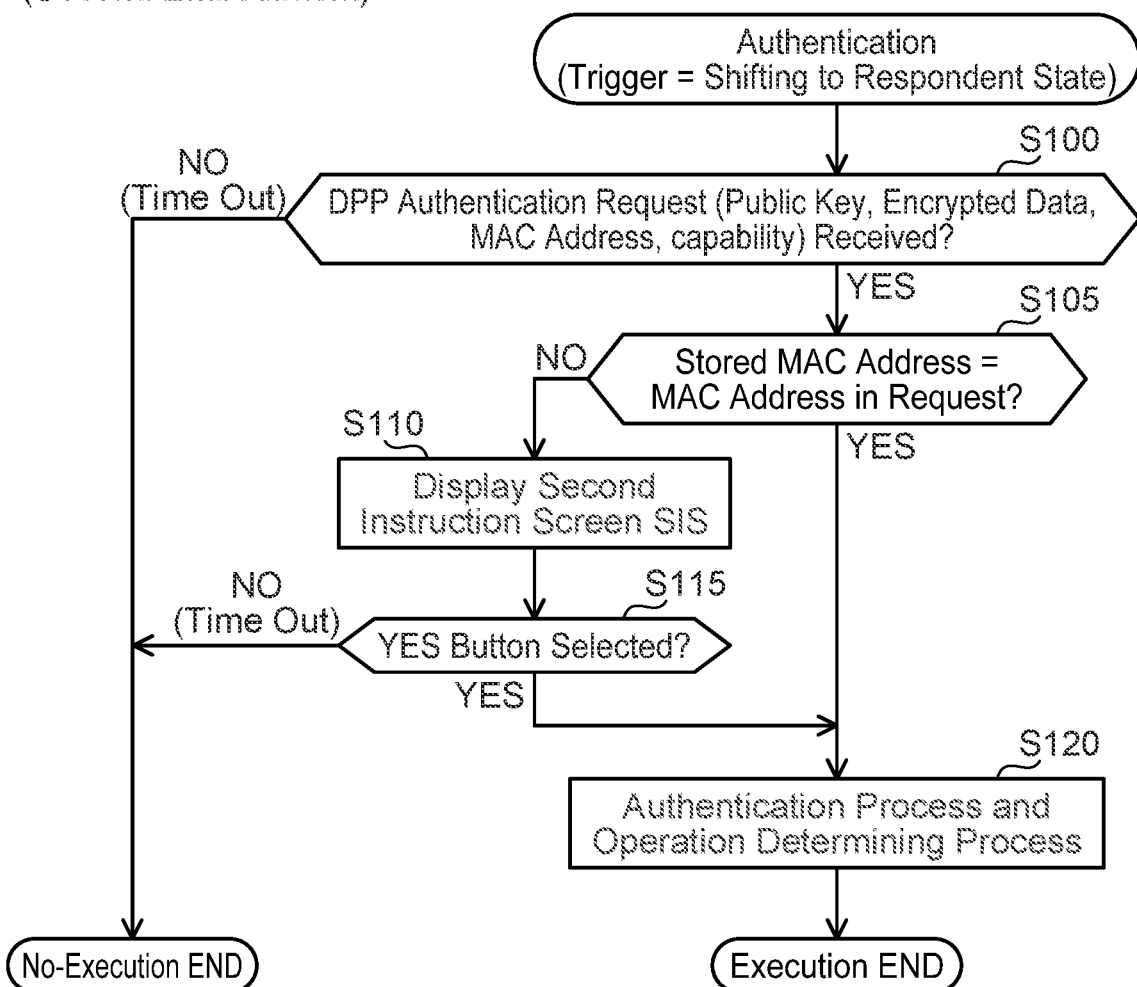
FIG. 9 shows a flowchart of an Authentication process according to the second embodiment.

Auth Process; FIG. 9

Next, details of a process executed by the printer 100 in the Auth of T25 of FIG. 2 will be described with reference to FIG. 9. The process of FIG. 9 is executed in the case where the printer 100 shifts to the respondent state in S35 of FIG. 8.

In S100, the printer 100 monitors receipt of the AReq via the Wi-Fi I/F 116. Hereinbelow, the sender terminal of this AReq will be termed "specific terminal". This AReq includes a public key of the specific terminal, encrypted data created by the specific terminal, a MAC address of the specific terminal, and a capability of the specific terminal (see T200 of FIG. 4). The printer 100 determines YES in S100 in a case where the AReq is received from the specific terminal, and proceeds to S105. On the other hand, the printer 100 determines NO in S100 in a case where the AReq is not received within a predetermined time since the printer 100 shifted to the respondent state (S35 of FIG. 8), and terminates the process of FIG. 9 as the no-execution END.

In S105, the printer 100 determines whether or not the MAC address of the target terminal stored in S30 of FIG. 8 is identical to the MAC address of the specific terminal in the AReq received in S100. The printer 100 determines YES in S105 in a case where the MAC address of the target terminal is identical to the MAC address of the specific terminal, and proceeds to S120. On the other hand, the printer 100 determines NO in S105 in a case where the MAC address of the target terminal is not identical to the MAC address of the specific terminal, and proceeds to S110. In the case where the process of S30 is skipped, that is, in the case where the MAC address is not stored in the memory 134, the printer 100 determines NO in S105 and proceeds to S110.

In S110, the printer 100 causes the display unit 114 to display a second instruction screen SIS for instructing to execute the connection process for establishing the Wi-Fi connection. The second instruction screen SIS incudes a YES button indicating that the connection process is to be executed.

In S115, the printer 100 determines whether or not the YES button in the screen SIS has been selected. In a case where the YES button in the screen SIS is selected by the user, the printer 100 determines YES in S115 and proceeds to S120. On the other hand, in a case where the YES button is not selected within a predetermined time since the screen SIS started to be displayed in S110 (that is, in a case of timeout), the printer 100 terminates display of the screen SIS. In this case, the printer 100 terminates the process of FIG. 9 as the no-execution END without executing processes from S120. In a variant, the screen SIS may include a NO button indicating that the connection process is not to be executed, and the printer 100 may determine NO in S115 in a case where the NO button in the screen SIS is selected by the user, and terminate the process of FIG. 9 as the no-execution END.

In S120, the printer 100 executes an authentication process and an operation determining process. The authentication process is a process for the printer 100 to authenticate its communication counterpart (that is, T202 to T210 of FIG. 4). The operation determining process is a process of determining as which of the Configurator and the Enrollee the printer 100 is to operate (that is, T220 to T224). In a case where the process of S120 is completed, the printer 100 terminates the process of FIG. 9 as the execution END, by which the Config is executed.

Figure 10:
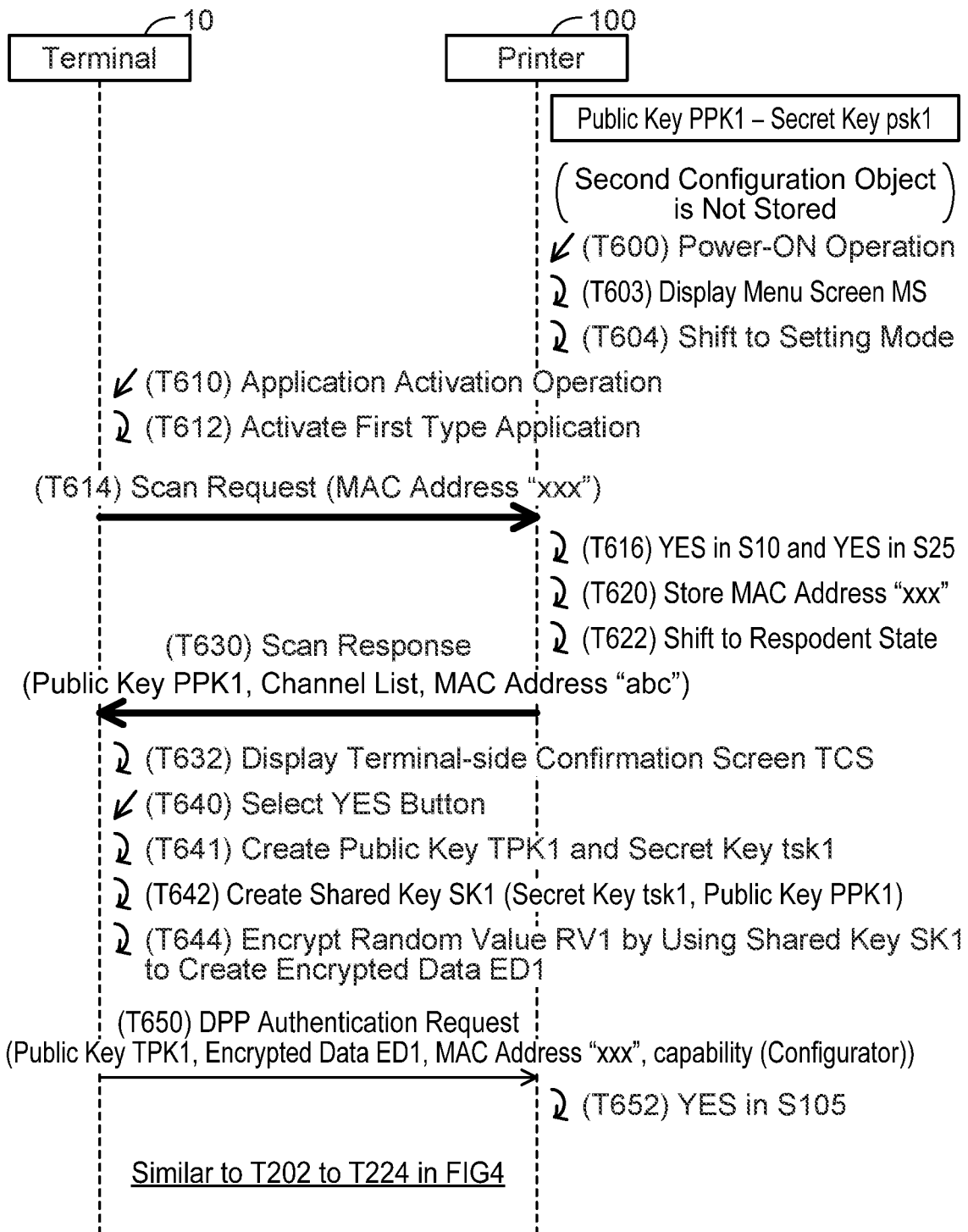
FIG. 10 shows a sequence diagram of Bootstrapping and Authentication processes of Case C.

BS and Auth of Case C; FIG. 10

Next, the BS and Auth processes of Case C realized by the processes of FIGS. 8 and 9 will be described with reference to FIG. 10. Case C assumes a situation in which a distance between the terminal 10 and the printer 100 is relatively small.

T600 to T614 are similar to T100 to T114 of FIG. 3. In T616, the printer 100 determines that the radio field intensity of the received SReq is equal to or greater than the threshold value (YES in S10 of FIG. 8) since the distance between the terminal 10 and the printer 100 is relatively small. Further, the printer 100 determines that the received SReq includes the MAC address "xxx" (YES in S25). As a result, the printer 100 stores the MAC address "xxx" in the SReq in the memory 134 in T620 (S30), and shifts from the non-respondent state to the respondent state in T622 (S35).

T630 to T650 are similar to T130 to T140 of FIGS. 3 and T141 to T200 of FIG. 4. In T652, the printer 100 determines that the MAC address "xxx" stored in T620 is identical to the MAC address "xxx" in the AReq received in T650 (YES in S105 of FIG. 9). In this case, the printer 100 executes processes similar to T202 to T224 of FIG. 4 and terminates the process of FIG. 10. After this, processes similar to FIGS. 5 and 6 are executed by the respective devices 6, 10, 100, and the Wi-Fi connection is established between the printer 100 and the AP 6 (T40 of FIG. 2).

Figure 11:
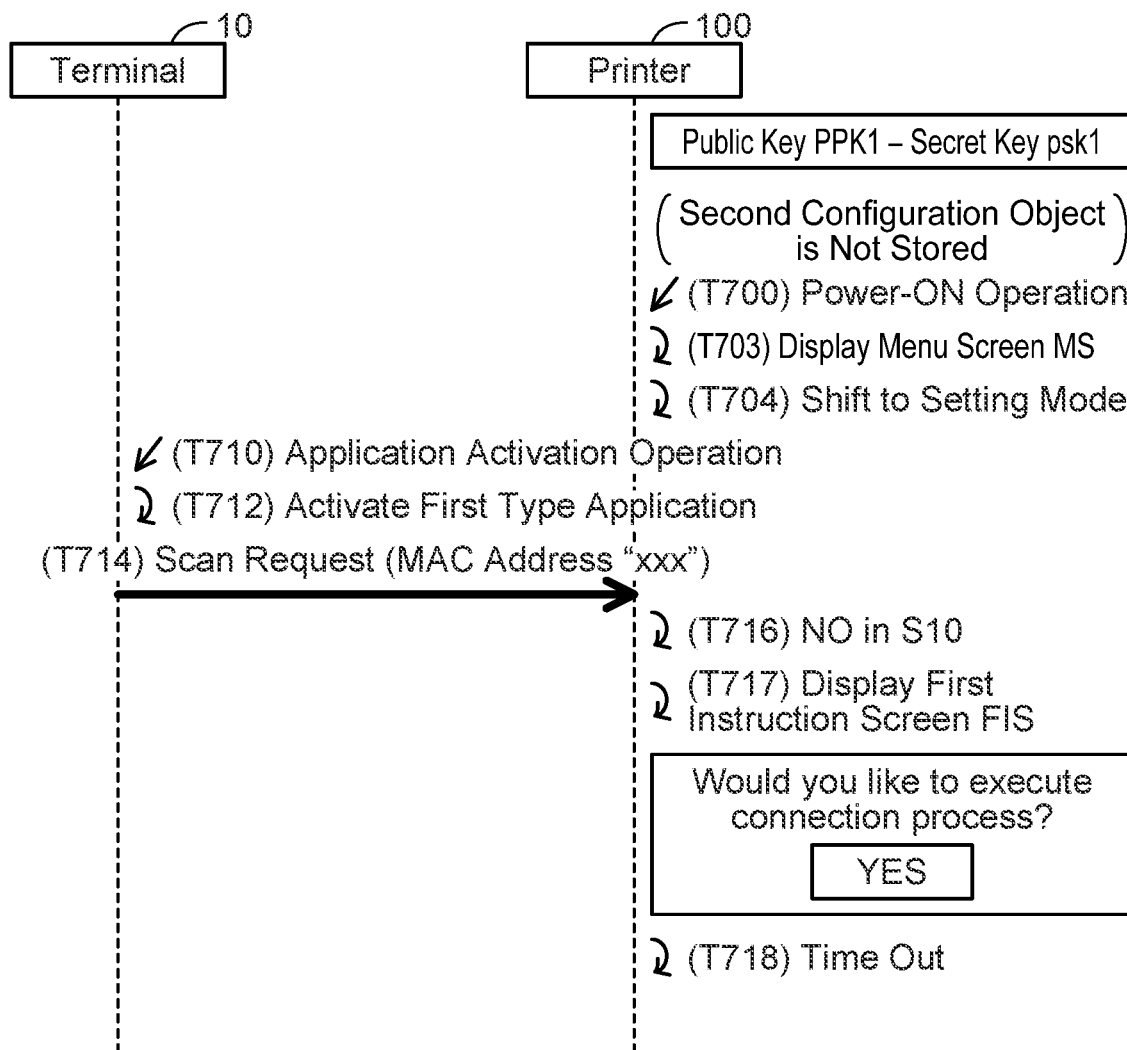
FIG. 11 shows a sequence diagram of Bootstrapping and Authentication processes of Case D.

BS and Auth of Case D; FIG. 11

Next, the BS and Auth processes of Case D realized by the processes of FIGS. 8 and 9 will be described with reference to FIG. 11. Case D assumes a situation in which the distance between the terminal 10 and the printer 100 is relatively large.

T700 to T714 are similar to T100 to T114 of FIG. 3. In Case D, since the distance between the terminal 10 and the printer 100 is relatively large, the printer 100 determines in T716 that the radio field intensity of the received SReq is less than the threshold value (NO in S10 of FIG. 8), and causes the display unit 114 to display the first instruction screen FIS in T717 (S15). Then, in T718, the printer 100 determines that the YES button in the first instruction screen FIS is not selected within the predetermined time (that is, the timeout occurs) (NO in S20), terminates display of the screen FIS and terminates the process of FIG. 11.

As shown in Case D, in the situation where the distance between the printer 100 and the terminal 10 is relatively large, it is highly likely that the user of the terminal 10 does not wish to have communication according to the DPP scheme (that is, the communication in which the public key PPK1 is used) executed between the printer 100 and the terminal 10. For example, a situation is assumed in which the terminal 10 is present at a location that is quite far from the printer 100 and the user of the terminal 10 wishes to establish a Wi-Fi connection between the AP 6 and a printer that is different from the printer 100. In such a situation, if the printer 100 automatically executes the processes from T620 of FIG. 10 and sends the SRes to the terminal 10 (T630) in response to receiving the SReq from the terminal 10, a Wi-Fi connection may be established between the printer 100 and the AP 6. That is, a Wi-Fi connection may be established between a pair of devices (that is, the printer 100 and the AP 6) which is not intended by the user of the terminal 10.

Contrary to this, in Case D, the printer 100 restricts sending of the public key PPK1 (T717) by determining that the radio field intensity of the received SReq is less than the threshold value in the case of receiving the SReq from the terminal 10 (T714) and causing the display unit 114 to display the first instruction screen FIS. Since the user of the terminal 10 does not wish to have the printer 100 establish the Wi-Fi connection, the user does not select the YES button in the screen FIS. As a result, the printer 100 determines the timeout (T718), and does not send the SRes to the terminal 10. As such, establishment of the Wi-Fi connection between the printer 100 and the AP 6 can be prevented. That is, establishment of the Wi-Fi connection between the pair of devices which is not intended by the user of the terminal 10 can be prevented. In Case D, in a case where the user of the terminal 10 wishes to establish the Wi-Fi connection between the printer 100 and the AP 6, the YES button in the screen FIS is selected by the user. In this case, the processes from T202 of FIG. 4 are executed, and the Wi-Fi connection is thereby established between the printer 100 and the AP 6. As such, a Wi-Fi connection according to the user's intention can be established.

Figure 12:
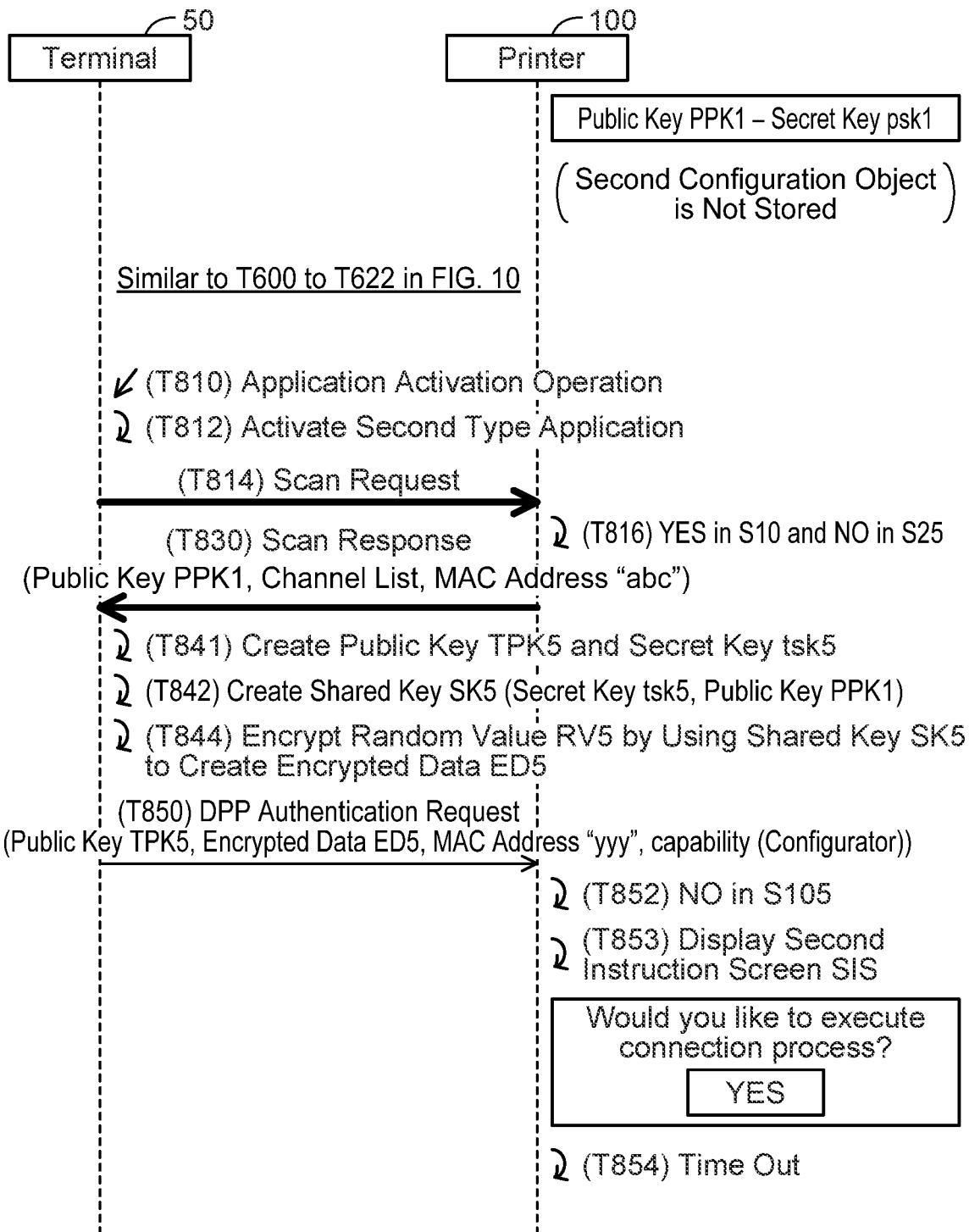
FIG. 12 shows a sequence diagram of Bootstrapping and Authentication processes of Case E.

BS and Auth of Case E; FIG. 12

Next, the BS and Auth processes of Case E realized by the processes of FIGS. 8 and 9 will be described with reference to FIG. 12. Here, the terminal 10 is provided with the first type app 40 provided by the vendor of the printer 100. Due to this, the user of the terminal 10 highly likely wishes to have the printer 100 establish the Wi-Fi connection. On the other hand, the terminal 50 is provided with the second type app 52 provided by the entity different from the vendor of the printer 100. Due to this, it is less likely that the user of the terminal 50 wishes to have the printer 100 establish the Wi-Fi connection. Case E assumes a situation in which the user of the terminal 10 wishes to establish the Wi-Fi connection between the printer 100 and the AP 6, while the user of the terminal 50 wishes to establish a Wi-Fi connection between a printer different from the printer 100 and an AP different from the AP 6.

In Case E, processes similar to T600 to T622 of FIG. 10 are firstly executed by the terminal 10 and the printer 100. As a result, the printer 100 stores the MAC address "xxx" of the terminal 10 in the memory 134 (T620) and shifts from the non-respondent state to the respondent state (T622).

Thereafter, before the AReq is sent from the terminal 10 to the printer 100 (that is, before T650 of FIG. 10), an activation operation for the second type app 52 is performed on the terminal 50 by the user of the terminal 50 in T810 and the second type app 52 is thereby activated in T812. As a result, the terminal 50 executes following processes according to the second type app 52. The terminal 50 has already executed processes similar to T5 to T15 of FIG. 2 with the different AP before executing the processes from T810.

In T814, the terminal 50 sends a SReq to the printer 100. Here, the second type app 52 sends the SReq that does not include the MAC address "yyy" of the terminal 50, unlike the first type app 40 provided by the vendor of the printer 100. As such, the MAC address "yyy" of the terminal 50 is not stored in the printer 100.

In a case of receiving the SReq from the terminal 50 via the BT I/F 118 in T814 (YES in S5 of FIG. 8), the printer 100 determines in T816 that the radio field intensity of this SReq is equal to or greater than the threshold value (YES in S10) due to the distance between the terminal 50 and the printer 100 being relatively small as well as determines that this SReq does not include a MAC address (NO in S25).

T830 to T850 are similar to T630 to T650 of FIG. 10 except that a public key TPKS, a secret key tsk5, a shared key SKS, a random value RVS, encrypted data EDS, and the MAC address "yyy" of the terminal 50 are used. The second type app 52 does not display the terminal-side confirmation screen TCS. As such, the terminal 50 does not execute the processes of T632 and In T852, the printer 100 determines that the MAC address "xxx" stored in T620 is not identical to the MAC address "yyy" in the AReq received in T850 (NO in S105 of FIG. 9). In this case, the printer 100 causes the display unit 114 to display the second instruction screen SIS in T852 (S110). Then, in T854, the printer 100 determines that the YES button in the screen SIS is not selected within the predetermined time (that is, the timeout occurs) (NO in S115 of FIG. 4), terminates displaying the screen SIS, and terminates the process of FIG. 12.

If the printer 100 automatically executes the processes from T202 of FIG. 4 and sends the ARes to the terminal 50 in response to receiving the AReq from the terminal 50 (T850), the Wi-Fi connection may be established between the printer 100 and the different AP. That is, a Wi-Fi connection may be established between a pair of devices (that is, the printer 100 and the different AP as above) which is not intended by the user of the terminal 50.

Contrary to this, in Case E, in the case of receiving the AReq from the terminal 50 (T850), the printer 100 restricts sending of the ARes (T852) by causing the display unit 114 to display the second instruction screen SIS due to the MAC address "xxx" of the terminal 10 stored in the memory 134 being not identical to the MAC address "yyy" of the terminal 50 in the AReq. Since the user of the terminal 50 does not wish to have the printer 100 establish the Wi-Fi connection, the user does not select the YES button in the screen SIS. As a result, the printer 100 determines the timeout (T854), and does not send the ARes to the terminal 50. As such, establishment of the Wi-Fi connection between the printer 100 and the different AP can be prevented. That is, establishment of the Wi-Fi connection between the pair of devices which is not intended by the user of the terminal 50 can be prevented. In Case E, in a case where the user of the terminal 50 wishes to establish the Wi-Fi connection between the printer 100 and the different AP, the YES button in the screen SIS is selected by the user. In this case, the processes from T202 of FIG. 4 are executed, and the Wi-Fi connection is thereby established between the printer 100 and the different AP. As such, a Wi-Fi connection according to the user's intention can be established.

Corresponding Relationships

The MAC address "xxx" and the terminal 50 are respectively examples of "identification information" and "different external device". The process of S5 of FIG. 8, the process of S10, the process of S40, the process of S100, the process of T210 of FIG. 4, the process of T310 of FIG. 5, and the processes of T35 and T40 of FIG. 2 are respectively examples of "receive a specific signal from a first external device" and "receive identification information from the first external device", "determine whether a radio field intensity of the received specific signal is equal to or greater than a threshold value", "send the public key to the first external device", "receive an authentication request from the first external device", "send an authentication response to the first external device", "receive connection information from the first external device", and "establish the wireless connection between the communication device and the second external device".

(Variant 1) The processes for creating the shared key (for example, SK1) (such as T142, T202 of FIG. 4) are not limited to the processes according to the ECDH described in the above embodiment, but may be other processes according to the ECDH. Further, the processes for creating the shared key are not limited to the processes according to the ECDH, and processes according to other schemes (such as Diffie-Hellman key exchange (DH)) may be executed instead. Further, in the above embodiment, the digital signatures DS1 and DS2 are created according to the ECDSA, however, they may be created according to other schemes (such as Digital Signature Algorithm (DSA), Rivest-Shamir-Adleman cryptosystem (RAS), etc.).

(Variant 2) The processes of S25, S30 of FIGS. 8 and S105 of FIG. 9 may be omitted. In this case, for example, the terminal 10 may send a SReq not including the MAC address "xxx" to the printer 100 in T614 of FIG. 10. In this variant, "receive identification information from the first external device" may be omitted.

(Variant 3) The processes of S15 and S20 of FIG. 8 may be omitted. In this case, in the case of determining NO in S10, the printer 100 terminates the process of FIG. 8 as the no-execution END. In this variant, not sending the SRes in the case of NO in S10 is an example of "sending of the public key to the first external device is restricted".

(Variant 4) The processes of S110 and S115 of FIG. 9 may be omitted. In this case, in the case of determining NO in S105, the printer 100 terminates the process of FIG. 9 as the no-execution END. In this variant, not sending the ARes in the case of NO in S105 is an example of "sending of the authentication response to the different external device is restricted". Further, in this variant, "cause the display unit to display a second instruction screen" may be omitted.

(Variant 5) For example, the SRes sent from the printer 100 in T130 of FIG. 3 may not include the channel list and the MAC address "abc". That is, this SRes may include at least the public key PPK1. In this case, in response to shifting from the non-respondent state to the respondent state in T122, the printer 100 monitors receipt of the AReq using one wireless channel among all the wireless channels which the printer 100 is capable of using. Further, in T200 of FIG. 4, the terminal 10 sequentially broadcasts the AReq by sequentially using all the wireless channels which the terminal 10 is capable of using. In this variant, "send communication channel information" may be omitted.

(Variant 6) For example, in response to receiving from the terminal 10 a signal that is different from the SReq and is according to the BT scheme (for example, Advertise signal) in T114 of FIG. 3, the printer 100 may cause the display unit 114 to display the first instruction screen FIS in T116. In this variant, this different signal is an example of "specific signal". Further, in this case, the printer 100 may send to the terminal 10 a signal according to the BT scheme (for example, Advertise signal) including the public key PPK1 in T130.

(Variant 7) The printer 100 may shift from the non-respondent state to the respondent state after having sent the SRes to the terminal 10 in T130 of FIG. 3. That is, the printer may simply need to shift from the non-respondent state to the respondent state after the specific signal has been received from the first external device.

(Variant 8) For example, the SReq in T614 of FIG. 10 may not include the MAC address "xxx". In this case, the terminal 10 may send the MAC address "xxx" to the printer 100 via the BT I/F 18 in response to receiving the SRes from the printer 100 in T630. As a result, the MAC address "xxx" is stored in the memory 134 in the printer 100. In this variant, "specific signal" may not include "identification information".

(Variant 9) The printer 100 may operate in the respondent state at all times. In this variant, "shift an operation state of the communication device from a non-respondent state to a respondent state" may be omitted.

(Variant 10) The BT I/F 118 of the printer 100 may operate in the setting mode at all times. In this variant, "shift an operation mode of the first wireless interface from a first mode to a second mode" may be omitted.

(Variant 11) In T614 of FIG. 10, the terminal 10 may send a SReq including a device name of the terminal 10, instead of the MAC address "xxx", to the printer 100 via the BT I/F 18. In this case, in T620, the printer 100 stores the device name of the terminal 10 in the SReq in the memory 134. Further, in T650 of FIG. 10, the printer 100 may receive an AReq including the device name of the terminal 10, instead of the MAC address "xxx", from the terminal 10 via the Wi-Fi I/F 116, and may execute the processes from T202 of FIG. 4 in a case where the device name stored in the memory 134 is identical to the device name in the AReq. In this variant, the device name of the terminal 10 is an example of "identification information". Generally speaking, "identification information" may be any information by which "first external device" is identified.

(Variant 12) In T35 of FIG. 2, the process of the NA may be executed between the terminal 10 and the printer 100, and a Wi-Fi connection may thereby be established between the terminal 10 and the printer 100. That is, "second external device" may be the same device as "first external device".

(Variant 13) In the above embodiment, the Wi-Fi connection between the printer 100 and the AP 6 is established by using the terminal 10. Instead of this, for example, a Wi-Fi connection may be established between the printer 100 operating as a Group Owner (G/O) of the WFD scheme (that is, a device operating as a parent station) and another device (that is, a device operating as a child station) by using the terminal 10. That is, "second external device" may not be "parent station".

(Variant 14) The printer 100 may be provided with a wireless interface according to a wireless communication scheme different from the BT scheme (for example, ZigBee scheme) instead of the BT I/F 118. In this variant, this wireless interface is an example of "first wireless interface".

(Variant 15) In T850, the terminal 50 may send an AReq not including the MAC address "yyy" to the printer 100. In this case, in response to receiving the AReq from the terminal 50 via the Wi-Fi I/F 116, the printer 100 may determine that the AReq does not include a MAC address and cause the display unit 114 to display the second instruction screen SIS.

(Variant 16) "Communication device" may not be the printer, and may be another device such as a scanner, a multi-function peripheral, mobile terminal, a PC, and a server.

(Variant 17) In the embodiment above, the processes of FIGS. 2 to 12 are implemented by software (that is, the program 136), however, at least one of these processes may be implemented by hardware such as a logic circuit.

What is claimed is:

1. A communication device comprising:
an instruction unit;
a first wireless interface;
a second wireless interface different from the first wireless interface;
a processor; and
a memory storing computer-readable instructions therein, the computer-readable instructions, when executed by the processor, causing the communication device to:
receive a specific signal from a first external device via the first wireless interface;
in a case where the specific signal is received from the first external device and a specific instruction is received via the instruction unit, send a public key for a connection process according to Device Provisioning Protocol (DPP) scheme to the first external device via the first wireless interface,
wherein in a case where the specific signal is received from the first external device and the specific instruction is not received via the instruction unit, the public key is not sent; and
after the public key has been sent to the first external device, establish, by executing the connection process according to the DPP scheme, a wireless connection between the communication device and a second external device via the second wireless interface.

2. The communication device as in claim 1, wherein:
the first wireless interface is configured to execute a wireless communication according to version 4.0 or later of a Bluetooth (registered trademark) scheme,
the specific signal is a Scan Request according to version 4.0 or later of the Bluetooth scheme, and
a Scan Response including the public key is sent to the first external device, the Scan Response being defined according to version 4.0 or later of the Bluetooth scheme.

3. The communication device as in claim 1, wherein
the computer-readable instructions, when executed by the processor, further cause the communication device to:
in a case where a predetermined condition is satisfied, shift an operation mode of the first wireless interface from a first mode in which the first wireless interface is incapable of interpreting the specific signal to a second mode in which the first wireless interface is capable of interpreting the specific signal, wherein the specific signal is received from the first external device via the first wireless interface after the operation mode of the first wireless interface has been shifted to the second mode.

4. The communication device as in claim 3, wherein
the computer-readable instructions, when executed by the processor, further cause the communication device to:
in a case where connection information for establishing the wireless connection between the communication device and the second external device via the second wireless interface is received from the first external device, store the connection information in the memory,
wherein in a case where the communication device is turned on in a situation where the connection information is not stored in the memory, the predetermined condition is satisfied, and
in a case where the communication device is turned on in a situation where the connection information is stored in the memory, the predetermined condition is not satisfied.

5. The communication device as in claim 4, further comprising:
an operation unit,
wherein in a case where a specific operation is received via the operation unit in the situation where the connection information is stored in the memory, the predetermined condition is satisfied.

6. The communication device as in claim 1, wherein
the second external device is different from the first external device and is a parent device that is to operate as a parent station in a wireless network, and
the wireless connection is established between the communication device and the second external device via the second wireless interface such that the communication device participates in the wireless network as a child station.

7. The communication device as in claim 1, wherein
the computer-readable instructions, when executed by the processor, further cause the communication device to:
after the specific signal has been received from the first external device and the specific instruction has been received, shift an operation state of the communication device from a non-respondent state to a respondent state, the non-respondent state being a state in which an authentication response is not sent from the communication device to the first external device in response to receiving an authentication request, in which the public key is used, from the first external device, the respondent state being a state in which the authentication response is sent in response to receiving the authentication request, and in a case where the specific signal is received from the first external device and the specific instruction is not received, the operation state of the communication device is not shifted from the non-respondent state to the respondent state; and
in a case where the authentication request is received from the first external device after the operation state of the communication device has been shifted to the respondent state, send the authentication response to the first external device via the second wireless interface.

8. A non-transitory computer-readable recording medium storing computer-readable instructions for a communication device,
wherein the computer-readable instructions, when executed by a processor of the communication device, cause the communication device to:
receive a specific signal from a first external device via a first wireless interface of the communication device;
in a case where the specific signal is received from the first external device and a specific instruction is received via an instruction unit of the communication device, send a public key for a connection process according to Device Provisioning Protocol (DPP) scheme to the first external device via the first wireless interface,
wherein in a case where the specific signal is received from the first external device and the specific instruction is not received via the instruction unit, the public key is not sent;
after the public key has been sent to the first external device, establish, by executing the connection process according to the DPP scheme, a wireless connection between the communication device and a second external device via a second wireless interface of the communication device.

* * * * *